United States Patent
Nagase

(10) Patent No.: US 8,566,079 B2
(45) Date of Patent: Oct. 22, 2013

(54) RETRIEVAL RESULT OUTPUTTING APPARATUS AND RETRIEVAL RESULT OUTPUTTING METHOD

(75) Inventor: Tomoki Nagase, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 867 days.

(21) Appl. No.: 12/728,715

(22) Filed: Mar. 22, 2010

(65) Prior Publication Data

US 2010/0250232 A1 Sep. 30, 2010

(30) Foreign Application Priority Data

Mar. 25, 2009 (JP) ................................. 2009-074191

(51) Int. Cl.
*G06F 17/28* (2006.01)
(52) U.S. Cl.
USPC ..................................................... 704/4; 704/2
(58) Field of Classification Search
USPC ......................................................... 704/2–7
See application file for complete search history.

(56) References Cited

U.S. PATENT DOCUMENTS

| 7,353,165 | B2 * | 4/2008 | Zhou et al. | 704/5 |
| 7,536,293 | B2 * | 5/2009 | Zhuo et al. | 704/2 |
| 2002/0143537 | A1 * | 10/2002 | Ozawa et al. | 704/254 |
| 2002/0188439 | A1 * | 12/2002 | Marcu | 704/5 |
| 2003/0125928 | A1 * | 7/2003 | Lee et al. | 704/4 |
| 2004/0002848 | A1 * | 1/2004 | Zhou et al. | 704/2 |
| 2004/0167770 | A1 * | 8/2004 | Zhuo et al. | 704/4 |
| 2005/0267734 | A1 * | 12/2005 | Masuyama | 704/2 |
| 2007/0174040 | A1 * | 7/2007 | Liu et al. | 704/2 |
| 2008/0133218 | A1 * | 6/2008 | Zhou et al. | 704/5 |

FOREIGN PATENT DOCUMENTS

| JP | 2006-134062 | 5/2006 |
| JP | 2008-165563 | 7/2008 |

* cited by examiner

*Primary Examiner* — Douglas Godbold
(74) *Attorney, Agent, or Firm* — Staas & Halsey LLP

(57) ABSTRACT

A retrieval result outputting apparatus evaluates degrees of matching on a character block basis between an input example sentence serving as a retrieval condition and retrieval example sentences retrieved using the input example sentence as the retrieval condition; extracts one of the retrieval example sentences as an extraction example sentence in accordance with the evaluation; selects a portion of the input example sentence as a reevaluation portion with reference to the extraction example. And then reevaluates on degrees of matching a character block basis between the retrieval example sentences and the reevaluation portion; re-extracts one of the retrieval example sentences as a re-extracted example sentence in accordance with the reevaluation; and outputs the extracted and re-extracted example sentences.

11 Claims, 27 Drawing Sheets

彼は、今日風邪気味だが、午後に大事な試験があるので、学校に行った。
(Kare wa, kyou kazegimi daga, gogo ni daijina shiken ga arunode, gakkou ni itta.)

RETRIEVAL RESULT OUTPUTTING APPARATUS AND RETRIEVAL RESULT OUTPUTTING METHOD

CROSS-REFERENCE TO RELATED APPLICATIONS

This application is based upon and claims the benefit of priority of the prior Japanese Patent Application No. 2009-74191, filed on Mar. 25, 2009, the entire contents of which are incorporated herein by reference.

FIELD

The present invention relates to a retrieval result outputting apparatus which outputs a result of example-sentence retrieval and a method for outputting the retrieval result.

BACKGROUND

In a field of industrial and business translation, efficient translation is required while high quality is maintained. Therefore, a bilingual-example-sentence retrieving system for retrieving pairs of sentences which have been translated before and corresponding original sentences stored in a database and reusing the retrieved pairs of translated sentences and the corresponding original sentences has been used.

In the bilingual-example-sentence retrieving system, an example sentence corresponding to an input sentence is retrieved from the database, and a translated sentence corresponding to the detected sentence is displayed. By referring to such translated sentences as described above, efficient translation can be attained when compared with a case where translation is performed from scratch. However, when a newly created sentence is translated, it is unlikely that an example sentence perfectly corresponding to an input sentence is detected. Therefore, a technique of generating partial sequences of the input sentence and detecting phrase candidates corresponding to a portion of the input sentence using the partial sequences has been proposed (for example, Japanese Laid-open Patent Publication No. 2006-134062).

Furthermore, a technique of assigning information on an upper-level link or a lower level link to a translated example sentence detected through retrieval using an input sentence and partial sequences of the input sentence and performing display of an example sentence including the translated example sentence detected on the basis of the link information in an expansion manner or performing display of an example sentence using a portion of the translated example sentence which has been detected in a shrinking manner has been proposed (for example, Japanese Laid-open Patent Publication No. 2008-165563).

SUMMARY

According to an aspect of the invention, a retrieval result outputting apparatus which outputs a result of example-sentence retrieval, includes one or more units, for example, devices, of an evaluating device for evaluating degrees of matching between an input example sentence serving as a retrieval condition and retrieval example sentences obtained as a result of the retrieval using the input example sentence as a retrieval key in a unit of a certain character block or a character string; extracting device for extracting one of the retrieval example sentences as an extraction example sentence in accordance with the evaluation; reevaluation portion selecting device for selecting a portion of the input example sentence as a reevaluation portion with reference to the extraction example sentence; reevaluating device for reevaluating the degrees of matching between the retrieval example sentences and the reevaluation portion in a unit of a certain character block or a character string; re-extracting device for re-extracting one of the retrieval example sentences as a re-extraction example sentence in accordance with the reevaluation; and outputting device for outputting the example sentence extracted using the extracting device and the example sentence which has been re-extracted using the re-extracting device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 4 is a diagram illustrating an example of an input sentence according to the first embodiment;

FIG. 17 is a diagram illustrating a matching table according to a second embodiment;

FIG. 19 is a diagram illustrating a matching table according to the second embodiment;

DESCRIPTION OF EMBODIMENTS

A first embodiment of the present invention will be described with reference to the accompanying drawings.

Figure 1:
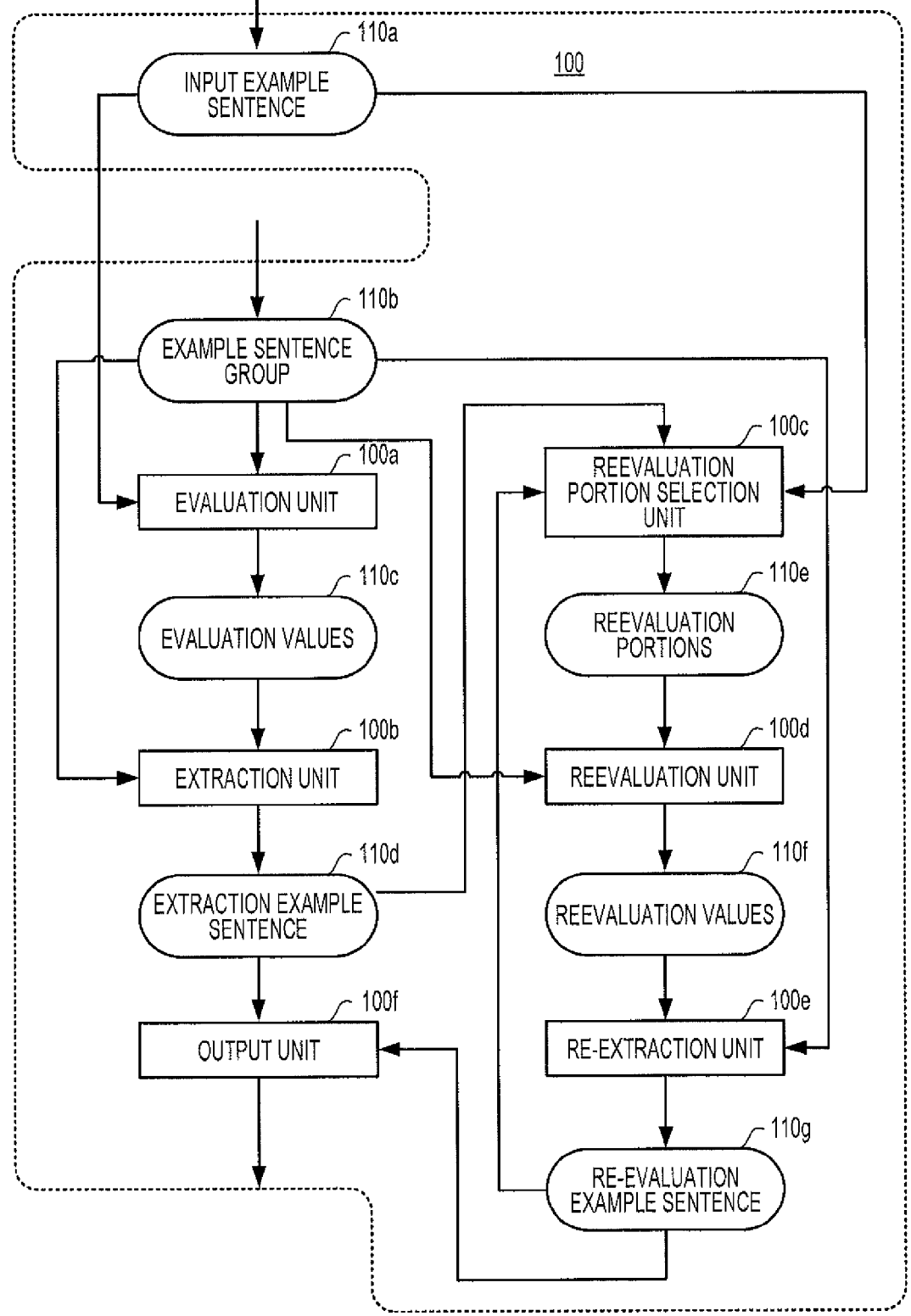
FIG. 1 is a diagram illustrating an outline of a first embodiment of the present invention.

FIG. 1 is a diagram illustrating an outline of the first embodiment of the present invention, A retrieval result outputting apparatus 100 of this embodiment outputs a retrieval example sentence group 110b which is a result of retrieval of example sentences using an input example sentence 110a as a key in an appropriate order.

The retrieval result outputting apparatus 100 includes an evaluation unit 100a, an extraction unit 100d, a reevaluation portion selection unit 100c, a reevaluation unit 100d, a re-extraction unit 100e, and an output unit 100f.

The evaluation unit 100a evaluates a matching degree of the input example sentence 110a and the retrieval example sentence group 110b in a unit of a certain character block or a character string so as to obtain an evaluation value 110c. The input example sentence 110a is used as a retrieval key for the example-sentence retrieval. The example sentence group 100b is a result of a process of retrieving example sentences using the input example sentence 110a as the retrieval key, and is a group including a plurality of example sentences. The input example sentence 110a is input using an input device such as a keyboard 12 or a mouse 13, which will be described hereinafter. The input example sentence 110a is, for example, input by the keyboard 12 or selected by the mouse 13. Alternatively, the input example sentence 110a is received from a computer (retrieval server) connected through a network. The example sentence group 110b is obtained as a result of the process of retrieving example sentences corresponding to the input example sentence 110a from among example sentences stored in the database. The database stores a plurality of example sentences in a storage device such as a hard disk drive (HDD), which will be described hereinafter. Examples of the storage device includes an incorporated storage device, a storage device which is externally connected, and a storage device included in a computer (data server) which is provided separately from the retrieval result outputting apparatus 100 and which is connected through the network. The evaluation values 110c are used to compare results of evaluations of the example sentences included in the example sentence group 110b with one another.

Note that a retrieving unit which performs the process of retrieving example sentences from among the example sentences stored in the database using the input example sentence 110a as the retrieval key may be included in the retrieval result outputting apparatus 100 or may be included in the computer (retrieval server) which is provided separately from the retrieval result outputting apparatus 100 and which is connected to the network.

The extraction unit 100b extracts an extraction example sentence 110c from the example sentence group 110b in accordance with the evaluation values 110d. Specifically, for example, when the example sentence group 110b includes a plurality of example sentences, the extraction unit 100b extracts an example sentence which has the maximum evaluation value 110c obtained by comparing the evaluation values 110c with one another, and determines the example sentence having the maximum evaluation value 110c as the extraction example sentence 110d.

The reevaluation portion selection unit 100c selects portions of the input example sentence 110a which are other than portions which contribute to obtaining of the evaluation value 110c of the extraction example sentence 110d as reevaluation portions 110e. For example, the portions of the input example sentence 110a which contribute to obtaining of the evaluation value 110c of the extraction example sentence 110d are specified in a unit of a character block or a character string, and other portions of the input example sentence 110a (non-contribution portions) are selected as reevaluation portions 110e. Accordingly, the reevaluation portions 110e correspond to the portions of the input example sentence 110a. According to an aspect of an embodiment a character block or character string is a block of one or more characters in a sentence in a language, and, for example, an evaluation and/or reevaluation can be performed on a character-by-character basis, on a word-by-word basis, or on a sentence segment-by-segment basis, each sentence segment including two or more words, or any combinations thereof.

The reevaluation unit 100d reevaluates matching degrees between the example sentences of the example sentence group 110b and the reevaluation portions 110e in a certain unit of a character block or a character string so as to obtain reevaluation values 110f. The reevaluation unit 110e determines example sentences of the example sentence group 110b other than example sentences which have been extracted or re-extracted as example sentences to be reevaluated. The reevaluation values 110f are used to compare the evaluation values of the example sentences included in the example sentence group 110b with one another.

The re-extraction unit 100e re-extracts one of the example sentences included in the example sentence group 110b as a re-evaluation example sentence 110g in accordance with the reevaluation values 110f. Specifically, for example, when the example sentence group 110b includes the plurality of example sentences, the re-extraction unit 100e compares the reevaluation values 110f of the example sentences with one another so as to obtain an example sentence having the maximum reevaluation value 110f as the re-extraction example sentence 110g.

The output unit 100f outputs the extraction example sentence 110d extracted by the extraction unit 100b and the re-evaluation example sentence 110g which is re-extracted by the re-extraction unit 100e as retrieval results to be displayed. Examples of the output unit 100f include a display device such as a monitor 11 which will be described below, an audio output device, a printing device, and data-outputting device. Furthermore, the retrieval results to be displayed may be output in a certain order or may be output after output order information is added thereto so that the retrieval results are sorted in a certain order.

Note that the reevaluation portion selection unit 100c can further select portions of the input example sentence 100a as the reevaluation portions 110e in accordance with the reevaluation example sentence 110g. The retrieval result outputting apparatus 100 repeatedly performs a selection of one of the reevaluation portions, reevaluation, and re-extraction of the re-extraction example sentence 110g so as to obtain a plurality of re-extraction example sentences 110g. That is, the retrieval result outputting apparatus 100 successively extracts example sentence groups 110b in different evaluation criteria.

As described above, in the retrieval result outputting apparatus 100, the evaluation unit 100a evaluates the example sentence group 110b using the input example sentence 110a as a criterion whereas the reevaluation unit 110d evaluates (reevaluates) the example sentence group 110b using the reevaluation portions 110e as criteria. Therefore, in the retrieval result outputting apparatus 100, the maximum evaluation value among the evaluation values 110c may not match the maximum evaluation value of the reevaluation values 110f, and accordingly, similar retrieval results based on the same evaluation criterion are appropriately prevented from being consecutively obtained.

Note that the retrieval result outputting apparatus 100 functions as an example-sentence retrieval apparatus if the retrieval result outputting apparatus 100 includes a retrieval unit. Furthermore, the example-sentence retrieval apparatus functions as a bilingual example-sentence retrieval apparatus if the output unit outputs sentences which have been translated in a certain language and which in advance corresponded to detected example sentences in an original language as translated example sentences.

Figure 2:
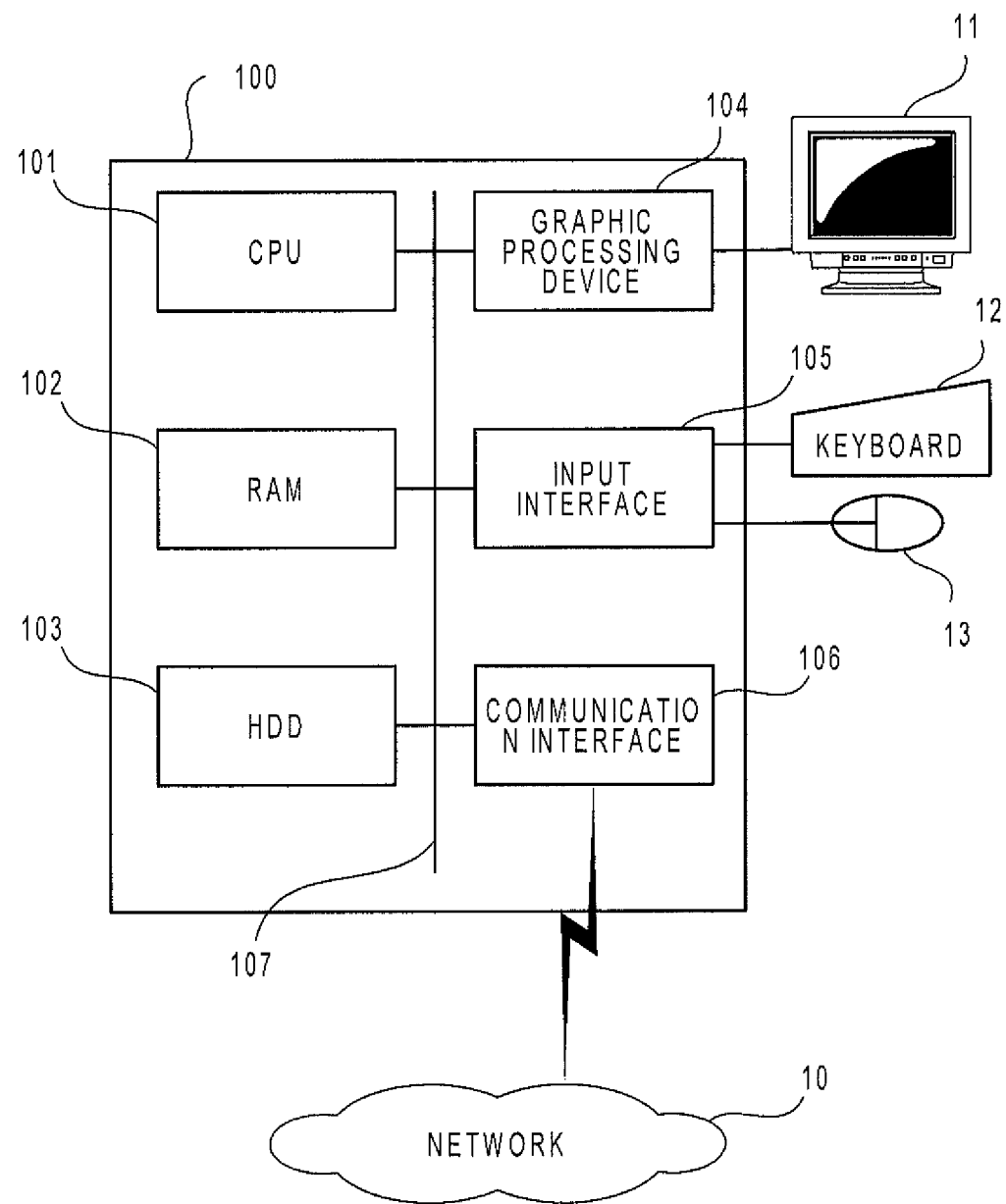
FIG. 2 is a diagram illustrating an example of a hardware configuration of a retrieval result outputting apparatus according to the first embodiment.

Next, a configuration of this embodiment will be described in detail. FIG. 2 is a diagram illustrating an example of a hardware configuration of the retrieval result outputting apparatus 100 according to this embodiment. The entire retrieval result outputting apparatus 100 is controlled by a CPU (Central Processing Unit) 101. A RAM (Random Access Memory) 102, a hard disk drive (HDD) 103, a graphic processing device 104, an input interface 105, and a communication interface 106 are connected to the CPU 101 through a bus 107.

The RAM 102 temporarily stores at least some of programs of an OS (Operating System) to be executed by the CPU 101 and application programs used to execute a server. The RAM 102 further stores various data required for processing performed by the CPU 101. The HDD 103 stores programs of the OS and application programs.

The graphic processing device 104 is connected to the monitor 11. The graphic processing device 104 displays an image in a screen of the monitor 11 under control of the CPU 101.

The keyboard 12 and the mouse 13 are connected to the input interface 105. The input interface 105 transmits a signal supplied from the keyboard 12 or the mouse 13 to the CPU 101 through the bus 107.

The communication interface 106 is connected to a network 10. The communication interface 106 performs data transmission/reception with another computer through the network 10.

With this hardware configuration, a processing function of this embodiment is realized. Note that the computer (for example, the data server or the retrieval server) connected through the network 10 can be realized with a similar hardware configuration.

Figure 3:
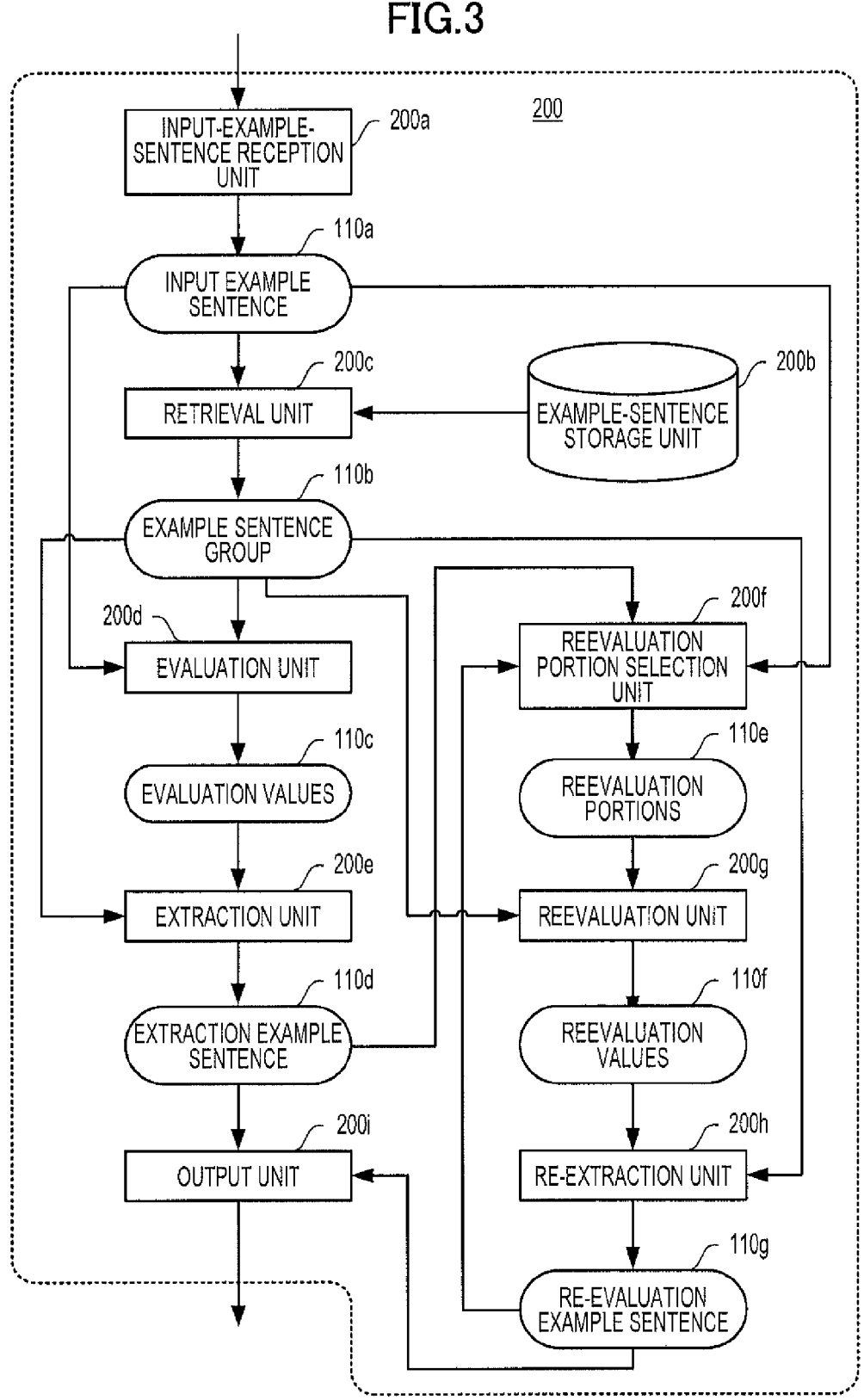
FIG. 3 is a functional block diagram illustrating an example-sentence retrieving apparatus according to the first embodiment.

FIG. 3 is a functional block diagram illustrating an example-sentence retrieving apparatus 200 according to this embodiment. The example-sentence retrieving apparatus 200 outputs a result of a process for retrieving example sentences using the input example sentence 110a as a key to be displayed in an appropriate order.

The input example sentence 110a is a sentence written in a certain language (such as Japanese, English, French, or German), for example. Example sentences group 100b to be retrieved are written in a language the same as the input example sentence 110a and are stored so as to be paired with corresponding sentences obtained by translating the original sentences (for example, an English sentence for Japanese (original language) sentence or Japanese sentence for English (original language) sentence) so as to be a reference used to translate the input example sentence 110a.

The example-sentence retrieving apparatus 200 includes an input-example-sentence reception unit 200a, an example-sentence storage unit 200b, a retrieval unit 200c, an evaluation unit 200d, an extraction unit 200e, a reevaluation portion selection unit 200f, a reevaluation unit 200g, a re-extraction unit 200h, and an output unit 200i.

The input-example-sentence reception unit 200a receives the input example sentence 110a input using the input device such as the keyboard 12 or the mouse 13. The input example sentence 110a is, for example, input by the keyboard 12 or selected by the mouse 13. Alternatively, the input example sentence 110a is received from a computer connected through a network.

The example-sentence storage unit 200b stores a plurality of example sentences in a storage unit such as the HDD 103. The database which stores the example sentences includes a group of text records. The translated sentences which are paired with the example sentences (sentences in an original language) may be stored in the database as the group of the text records or may be stored in the database in a data format having tags such as an XML format. Examples of the storage unit include an incorporated storage unit, a storage unit which is externally connected, a storage unit included in the computer (data server) which is provided separately from the example-sentence retrieving apparatus 200 and which is connected through the network. Furthermore, the example-sentence retrieving apparatus 200 may include one or more storage units.

The retrieval unit 200c retrieves example sentences using the input example sentence 110a as the retrieval key from among the example sentences stored in the example-sentence storage unit 200b and obtains the example sentence group 110b which is a group of a plurality of example sentences as a result of the retrieval. Note that various retrieval methods are known, and keyword matching retrieval, fuzzy search, or retrieval in accordance with a vector space model may be appropriately used.

The evaluation unit 200d evaluates matching degrees between the input example sentence 110a and the retrieval example sentence group 110b in a unit of a certain character block or a character string so as to obtain the evaluation values 110c. The evaluation values 110c are used to compare results of evaluations between the input example sentence 110a and the example sentences included in the example sentence group 110b.

The extraction unit 200e extracts the extraction example sentence 110d from the example sentence group 110b in accordance with the evaluation values 110c. Specifically, for example, when the example sentence group 110b includes the plurality of example sentences, the extraction unit 200e extracts an example sentence which has the maximum evaluation value 110c by comparing the evaluation values 110c with one another, and determines the example sentence having the maximum evaluation value 110c as the extraction example sentence 110d.

The reevaluation portion selection unit 200f selects portions of the input example sentence 110a which are other than portions which contribute to obtaining of the evaluation value 110c of the extraction example sentence 110d as reevaluation portions 110e. For example, the portions which contribute to obtaining of the evaluation value 110c of the extraction example sentence 110d are specified in a unit of a character block or a character string of the input example sentence 110a, and other portions of the input example sentence 110a are selected as reevaluation portions 110e. Accordingly, the reevaluation portions 110e correspond to the portions of the input example sentence 110a.

The reevaluation unit 200g reevaluates matching degrees between the example sentences of the example sentence group 110b and the reevaluation portions 110e in a unit of a certain character block or a character string so as to obtain reevaluation values 110f. The reevaluation unit 200g determines example sentences of the example sentence group 110b other than example sentences which have been extracted or re-extracted as example sentences to be reevaluated. The reevaluation values 110f are used to compare evaluation values of the example sentences included in the example sentence group 110b with one another.

The re-extraction unit 200h re-extracts one of the example sentences included in the example sentence group 110b as a re-evaluation example sentence 110g in accordance with the reevaluation values 110f. Specifically, for example, when the example sentence group 110b includes the plurality of example sentences, the re-extraction unit 200h compares the reevaluation values 110f of the example sentences so as to obtain an example sentence having the maximum reevaluation value 110f as the re-extraction example sentence 110g.

The output unit 200i outputs the extraction example sentence 110d extracted by the extraction unit 200e and the re-evaluation example sentence 110g which is re-extracted by the re-extraction unit 200h as retrieval results to be displayed. Examples of the output unit 200i include a display device such as the monitor 11 which will be described below, an audio output device, a printing device, and a data-outputting device. Furthermore, the retrieval results to be displayed may be output in a certain order or may be output after output order information is added to the retrieval results so that the retrieval results are aligned in a certain order.

Note that the reevaluation portion selection unit 200f further selects portions of the input example sentence 110a as the reevaluation portions 110e in accordance with the re-evaluation example sentence 110g. The example-sentence retrieving apparatus 200 repeatedly performs selection of reevaluation portions, reevaluation, and re-extraction on the re-evaluation example sentence 110g so as to obtain a plurality of re-evaluation example sentences 110g. That is, the example-sentence retrieving apparatus 200 successively extracts example sentence groups 110b by different evaluation criteria.

As described above, in the example-sentence retrieving apparatus 200, the evaluation unit 200d evaluates the example sentence group 110b using the input example sentence 110a as a criterion whereas the reevaluation unit 200g evaluates (reevaluates) the example sentence group 110b using the reevaluation portions 110e as a criterion. Therefore, in the example-sentence retrieving apparatus 200, the maximum evaluation value among the evaluation values 110c may not match the maximum evaluation value among the reevaluation values 110f, and accordingly, similar retrieval results based on the same evaluation criterion are appropriately prevented from being consecutively obtained.

Next a process, which is performed by the example-sentence retrieving apparatus 200, of outputting results of the example-sentence retrieval using the input example sentence 110a as a key so that the results are displayed in an appropriate order will be described with reference to FIGS. 4 to 12.

FIG. 4 is a diagram illustrating an example of an input example sentence according to this embodiment.

The example-sentence retrieving apparatus 200 accepts an example sentence 20 input using the input-example-sentence reception unit 200a. The input example sentence 20 "Kare wa, kyou kazegimi daga, gogo ni daijina shiken ga arunode, gakkou ni itta." is written in Japanese as an original language.

Figure 5:
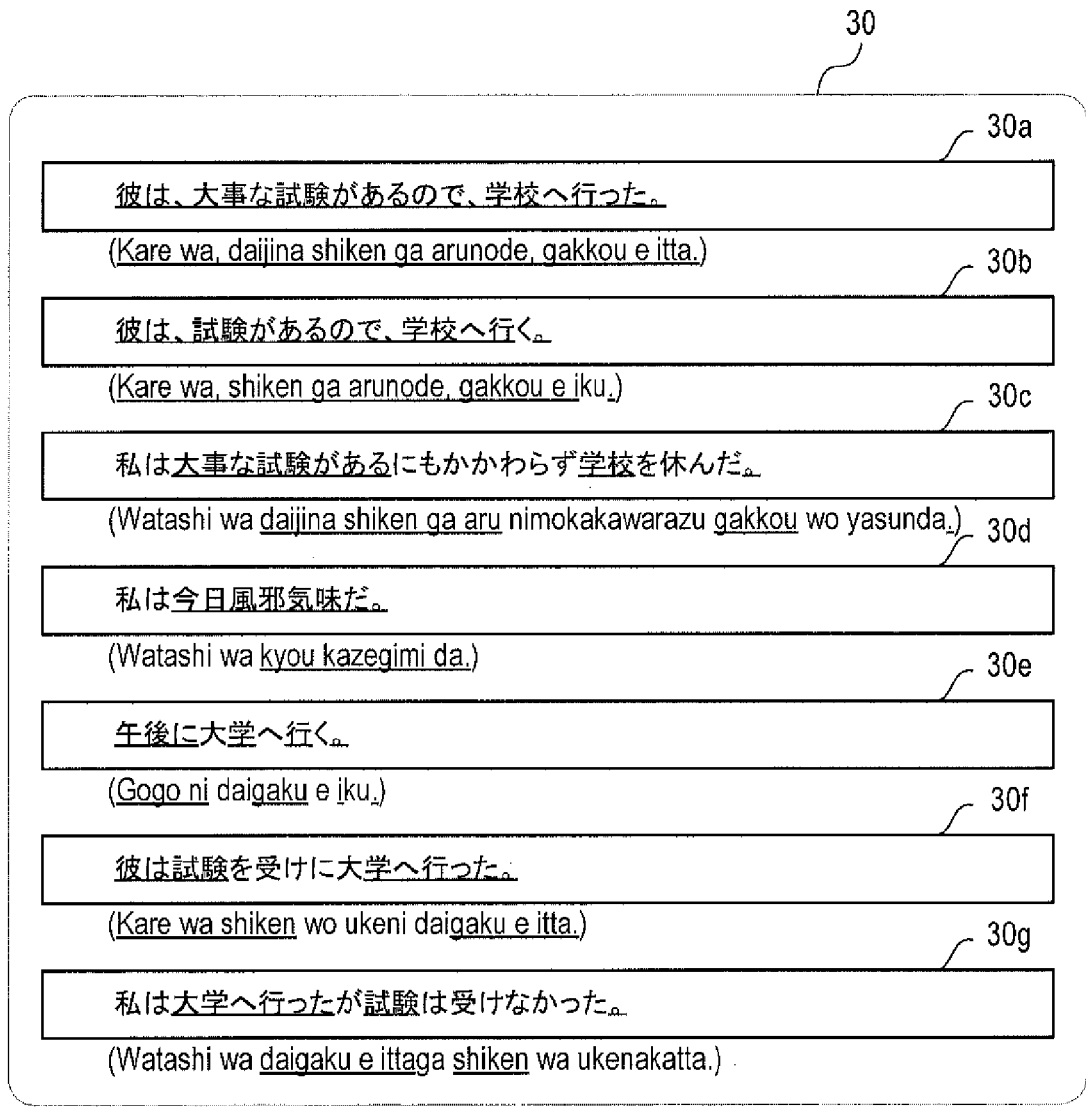
FIG. 5 is a diagram illustrating examples of retrieved sentences according to the first embodiment.

FIG. 5 is a diagram illustrating examples of retrieval example sentences according to this embodiment.

The example-sentence retrieving apparatus 200 obtains a retrieval example sentence group 30 as a result of retrieval in accordance with a certain retrieval algorithm using the example sentence 20 as a key. The retrieval example sentence group 30 includes seven retrieval example sentences including a retrieval example sentence 30a representing "Kare wa, daijina shiken ga arunode, gakkou e itta.", a retrieval example sentence 30b representing "Kare wa, shiken ga arunode, gakkou e iku.", a retrieval example sentence 30c "Watashi wa daijina shiken ga aru nimokakawarazu gakkou wo yasunda.", a retrieval example sentence 30d representing "Watashi wa kyou kazegimi da.", a retrieval example sentence 30e representing "Gogo ni daigaku e iku.", a retrieval example sentence 30f representing "Kare wa shiken wo ukeni daigaku e itta.", and a retrieval example sentence 30g representing "Watashi wa daigaku e ittaga shiken wa ukenakatta." Each of the retrieval example sentences 30a to 30g is written in Japanese as an original language, and are objects of retrieval using the example sentence 20. Note that underline portions of the sentences in FIG. 5 are matching portions which match certain portions of the example sentence 20.

Figure 6:
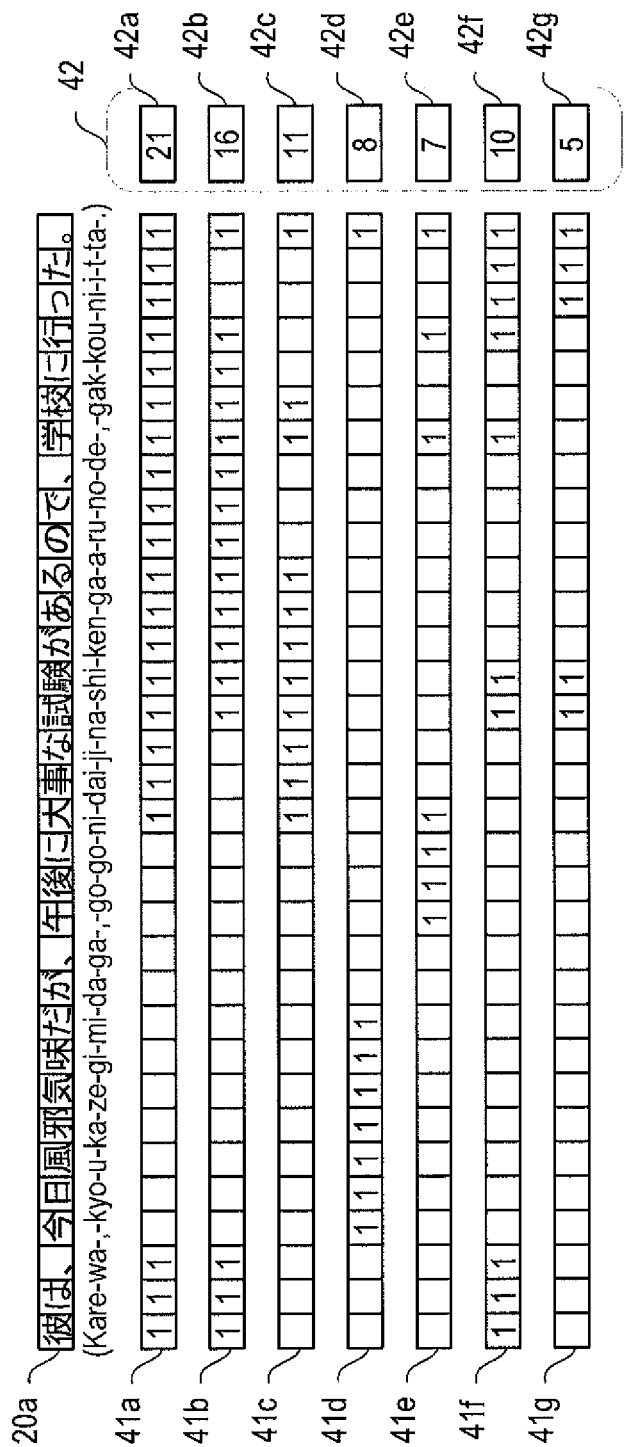
FIG. 6 is a diagram illustrating a matching table according to the first embodiment.

Next, evaluation of the example sentence group 30 performed by the example-sentence retrieving apparatus 200 will be described. FIG. 6 is a diagram illustrating a matching table 40 according to this embodiment.

The matching table 40 is a matrix table which records the correspondence relationship between each of the retrieval example sentences 30a to 30g and the evaluation portions of the example sentence 20 (the correspondence relationships of matching portions). The matching table 40 includes an input-example-sentence array 20a and retrieval-example-sentence arrays 41a to 41g. The input-example-sentence array 20a includes individual characters of the input example sentence 20, and individual elements of the array serve as reference elements of matching evaluation. The retrieval-example-sentence array 41a is an array for individual characters of the retrieval example sentence 30a. Individual elements of the retrieval-example-sentence array 41a are subjected to the matching evaluation by being compared with the array elements of the input example sentence 20. The retrieval-example-sentence array 41a is subjected to score evaluation so as to obtain a matching score 42 in accordance with results of the matching evaluation performed on the array elements. Therefore, the array elements of the retrieval-example-sentence array 41a serve as objects to be subjected to the matching evaluation. Similarly, the retrieval-example-sentence arrays 41b to 41g correspond to the retrieval example sentences 30b to 30g. In the matching evaluation, when one of the array elements of the input example sentence 20 corresponds to one of the array elements of the retrieval-example-sentence array 41a, a matching flag "1" is set.

Then, the matching score 42 is obtained as a result of the score evaluation performed on the individual retrieval-example-sentence arrays 41a to 41g. A matching score 42a is a value obtained by counting the number of matching flags "1" of the array elements of the retrieval-example-sentence array 41a. Similarly, each of matching scores 42b to 42g is a value obtained by counting the matching flags "1" of array elements of a corresponding one of the retrieval-example-sentence arrays 41b to 41g. Note that the matching flags of the array elements of the retrieval-example-sentence array 41a are "0" in an initial state.

Referring to FIG. 6, the maximum matching score value is "21" among the matching scores 42a to 42g. Therefore, the example-sentence retrieving apparatus 200 extracts the retrieval example sentence 30a "Kare wa, daijina shiken ga arunode, gakkou e itta." as an extraction example sentence 100f.

Note that another method for the matching evaluation and another method for the score evaluation may be appropriately employed other than the methods described above.

Figure 7:
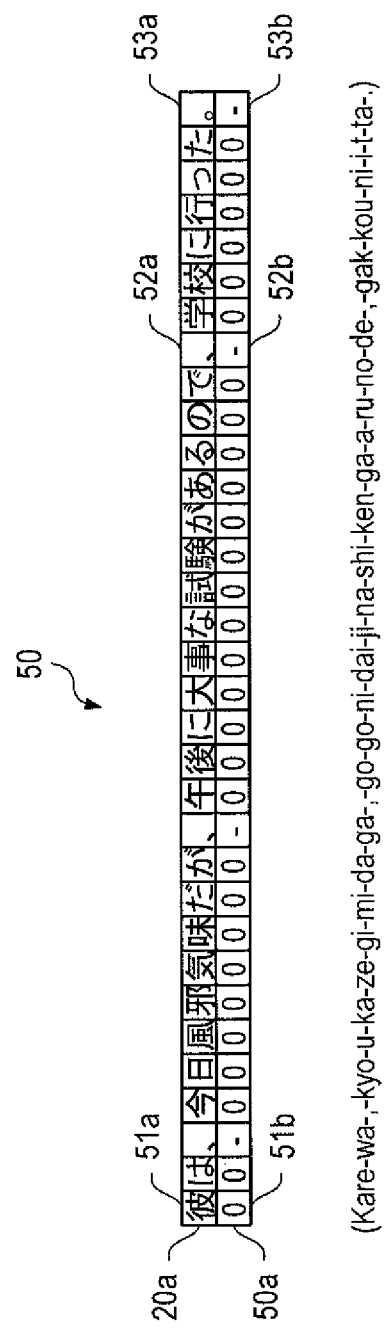
FIG. 7 is a diagram illustrating an initial state of an output flag array table according to the first embodiment.

FIG. 7 is a diagram illustrating an initial state of an output flag array table 50 according to this embodiment.

The output flag array table 50 includes the input-example-sentence array 20a and an output flag array 50a corresponding to the input-example-sentence array 20a. Elements of the output flag array 50a store output flags representing whether the corresponding elements of the input-example-sentence array 20a are effective as reference elements of the matching evaluation. In the initial state, since anything (any example sentence extracted from the example sentence group 30) has not been output, output flags "0" are assigned to the elements of the output flag array 50a. Note that, when an element of the input-example-sentence array 20a serves as a reference element of (for) the matching evaluation, an output flag "0" (shown as an output flag 51b, for example) or "1" is stored, whereas when an element of the input-example-sentence array 20a does not serve as a reference element of the matching evaluation, an output flag "–" (shown as output flags 52b and 53b, for example) is stored. The case where an element of the input-example-sentence array 20a serves as a reference element of the matching evaluation corresponds to a case where an element of the input-example-sentence array 20a corresponds to a certain character (for example, an input character 51a "Kare"). The case where an element of the input-example-sentence array 20a does not serve as a reference element of the matching evaluation corresponds to a case where an element of the input-example-sentence array 20a corresponds to a punctuation mark (for example, a comma represented as an input character 52a and a period represented as an input character 53a, for example).

Figure 8:
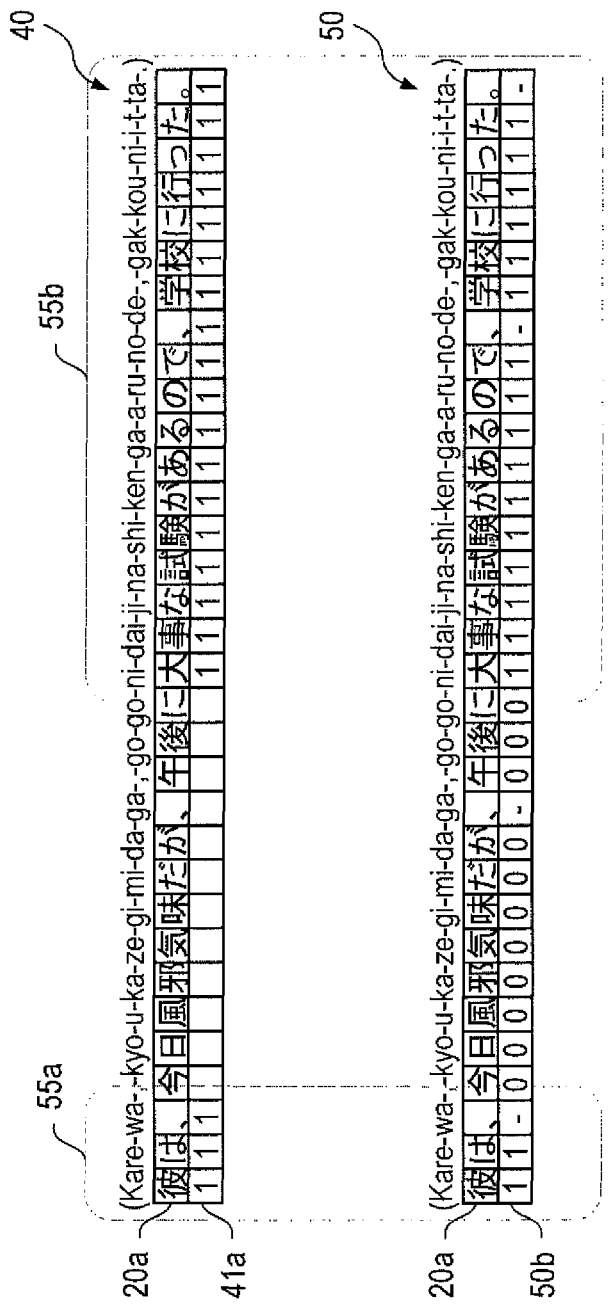
FIG. 8 is a diagram illustrating an updated state of the output flag array table according to the first embodiment.

Next, a process of selecting reevaluation portions of the example sentence group 30 performed by the example-sentence retrieving apparatus 200 will be described. FIG. 8 is a diagram illustrating an updated state of the output flag array table 50 according to this embodiment.

The example-sentence retrieving apparatus 200 updates an output flag array 50b of the output flag array table 50 when extracting the retrieval example sentence 30a as an extraction example sentence 100f. The example-sentence retrieving apparatus 200 refers to the elements of the retrieval-example-sentence array 41a corresponding to the retrieval example sentence 30a. When at least one of the elements of the retrieval-example-sentence array 41a has a matching flag "1", an output flag "1" is set as a corresponding element (for example, matching portions 55a and 55b) in the output flag array 50b. The output flag "1" included in the element of the output flag array 50b represents that an example sentence has been extracted from the example sentence group 30 obtained by reflecting the corresponding elements of the input-example-sentence array 20a. On the other hand, the output flag "0" included in the element of the output flag array 50b represents that any example sentence has not been extracted from the example sentence group 30 obtained by reflecting the corresponding elements of the input-example-sentence array 20a. Therefore, portions to be reevaluated of the example sentence group 30 (except for the retrieval example sentence 30a which has been extracted) are selected by (according to) the output flags "0" included in the elements of the output flag array 50b.

Figure 9:
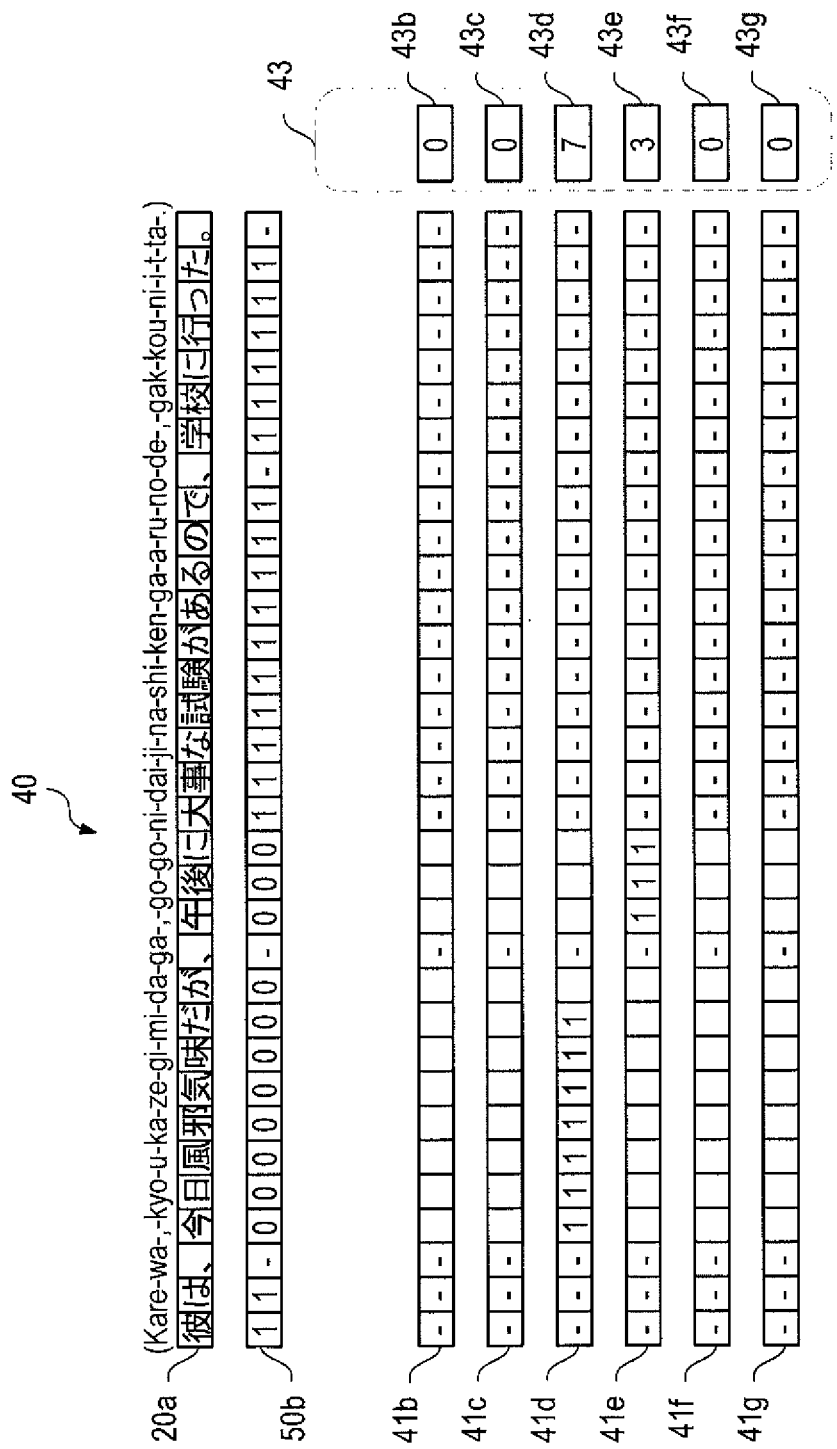
FIG. 9 is a diagram illustrating a matching table according to the first embodiment.

Next, reevaluation performed on the retrieval example sentence group 30 by the example-sentence retrieving apparatus 200 will be described. FIG. 9 is a diagram illustrating the matching table 40 according to this embodiment.

In the matching table 40, the retrieval-example-sentence array 41a corresponding to the retrieval example sentence 30a which has been extracted is omitted. Elements of the retrieval-example-sentence arrays 41b to 41g corresponding to the output flag "1" of the output flag array 50b are masked so as not to be reevaluated.

As a result of score evaluation (reevaluation) performed on the individual retrieval-example-sentence arrays 41b to 41g, a matching score 43 (including matching scores 43b to 43g) is obtained. According to the matching score 43, among the matching scores 43b to 43g, the maximum matching score value is "7", and therefore, the example-sentence retrieving apparatus 200 re-extracts the retrieval example sentence 30d "Watashi wa kyou kazegimi da." as a re-extraction (re-evaluation) example sentence 110h.

Figure 10:
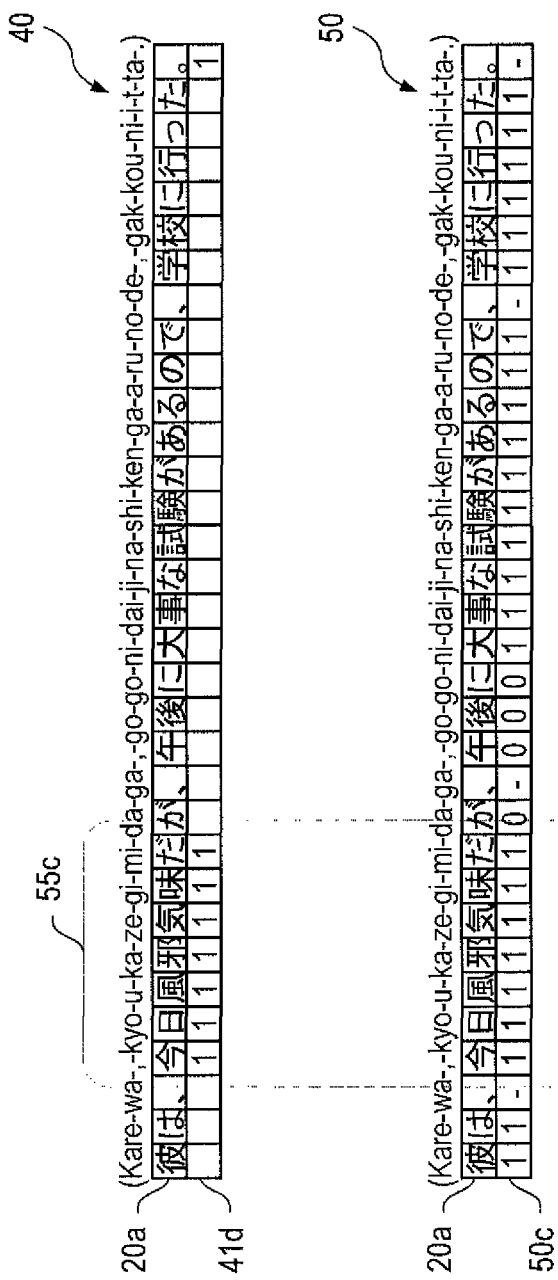
FIG. 10 is a diagram illustrating an updated state of the output flag array table according to the first embodiment.

A process of selecting, for the second time, reevaluation portions of the example sentence group 30 will now be described. FIG. 10 is a diagram illustrating an updated state of the output flag array table 50 according to this embodiment.

The example-sentence retrieving apparatus 200 updates an output flag array 50c of the output flag array table 50 when re-extracting the retrieval example sentence 30d as a re-extraction example sentence 110h. The example-sentence retrieving apparatus 200 refers to the elements of the retrieval-example-sentence array 41d corresponding to the retrieval example sentence 30d. When at least one of the elements of the retrieval-example-sentence array 41d has a matching flag "1", an output flag "1" is set in a corresponding element (for example, a matching portion 55c) in the output flag array 50c. The output flag "1" included in the element of the output flag array 50c represents that an example sentence has been extracted from the example sentence group 30 obtained by reflecting the corresponding elements of the input-example-sentence array 20a. On the other hand, the output flag "0" included in the element of the output flag array 50c represents that any example sentence has not been extracted from the example sentence group 30 obtained by reflecting the elements of the input-example-sentence array 20a. Therefore, portions to be reevaluated for the second time of the example sentence group 30 (except for the retrieval example sentence 30a which has been extracted and the retrieval example sentence 30d which has been re-extracted) are selected by the output flags "0" included in the elements of the output flag array 50c.

Figure 11:
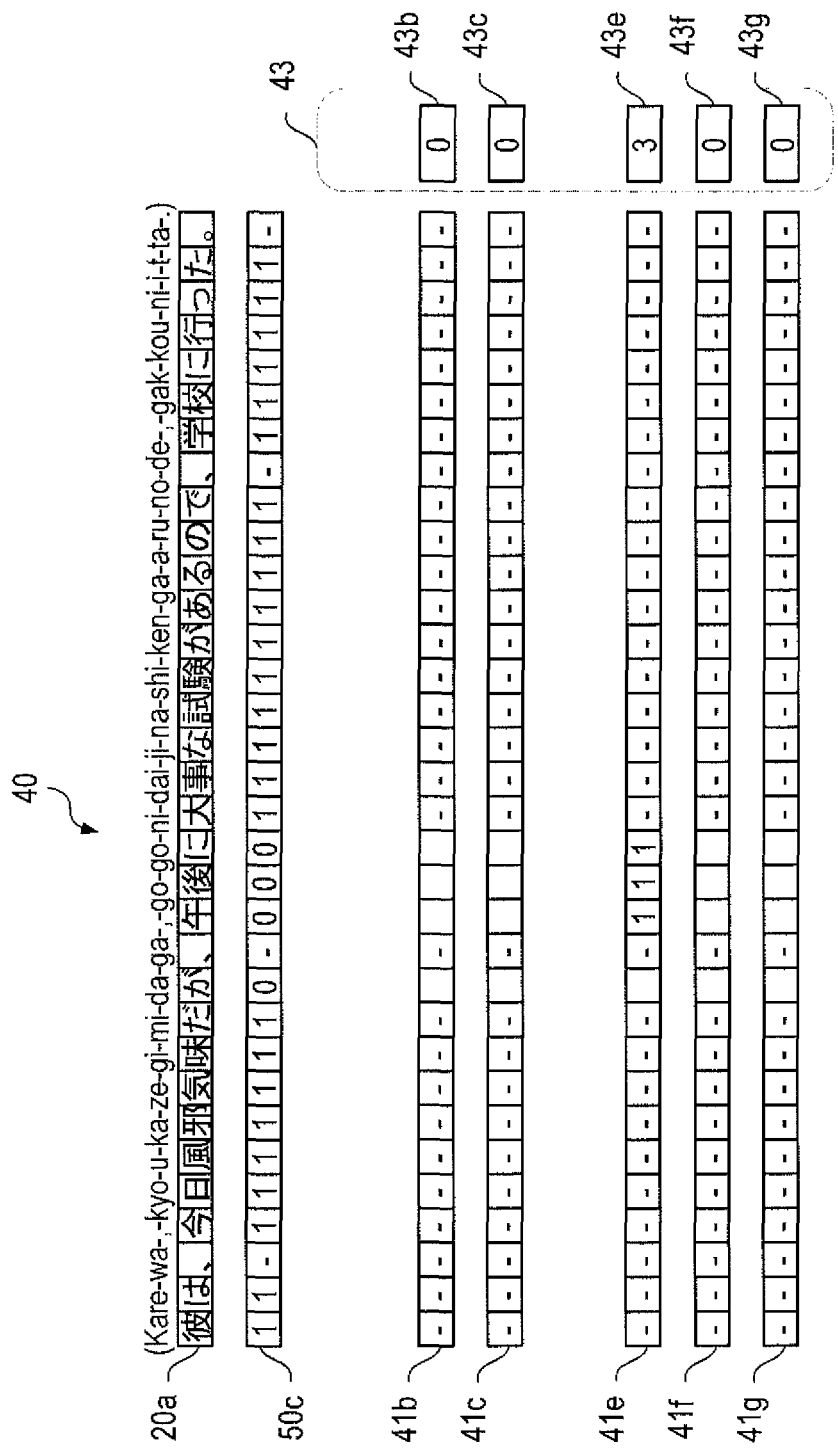
FIG. 11 is a diagram illustrating a matching table according to the first embodiment.

A process of reevaluating, for the second time, the example sentence group 30 performed by the example-sentence retrieving apparatus 200 will now be described. FIG. 11 is a diagram illustrating the matching table 40 according to this embodiment.

In the matching table 40, the retrieval-example-sentence array 41a corresponding to the retrieval example sentence 30a which has been extracted and the retrieval-example-sentence array 41d corresponding to the retrieval example sentence 30d which has been obtained by the re-extraction are omitted. The array elements of the retrieval-example-sentence arrays 41b, 41c, 41e, and 41g corresponding to the output flag "1" of the output flag array 50c are masked so as not to be reevaluated.

As a result of score evaluation (second reevaluation) performed on the individual retrieval-example-sentence arrays 41b, 41c, 41e, and 41g, the matching score 43 (matching scores 43b, 43c, 43e, and 43g) is obtained. According to the matching score 43, among the matching scores 43b, 43c, 43e, and 43g, the maximum value is "3", and therefore, the example-sentence retrieving apparatus 200 re-extracts the retrieval example sentence 30e "Gogo ni daigaku e iku." as an example sentence obtained through a second re-extraction.

Note that the number of times the re-extraction is performed may be appropriately determined in accordance with the number of required output example sentences. Furthermore, the output flag array table 50 may be initialized when a predetermined condition is satisfied, for example, when a predetermined example sentence is extracted. In this way, appropriate retrieval results can be displayed every time the predetermined condition is satisfied.

Figure 12:
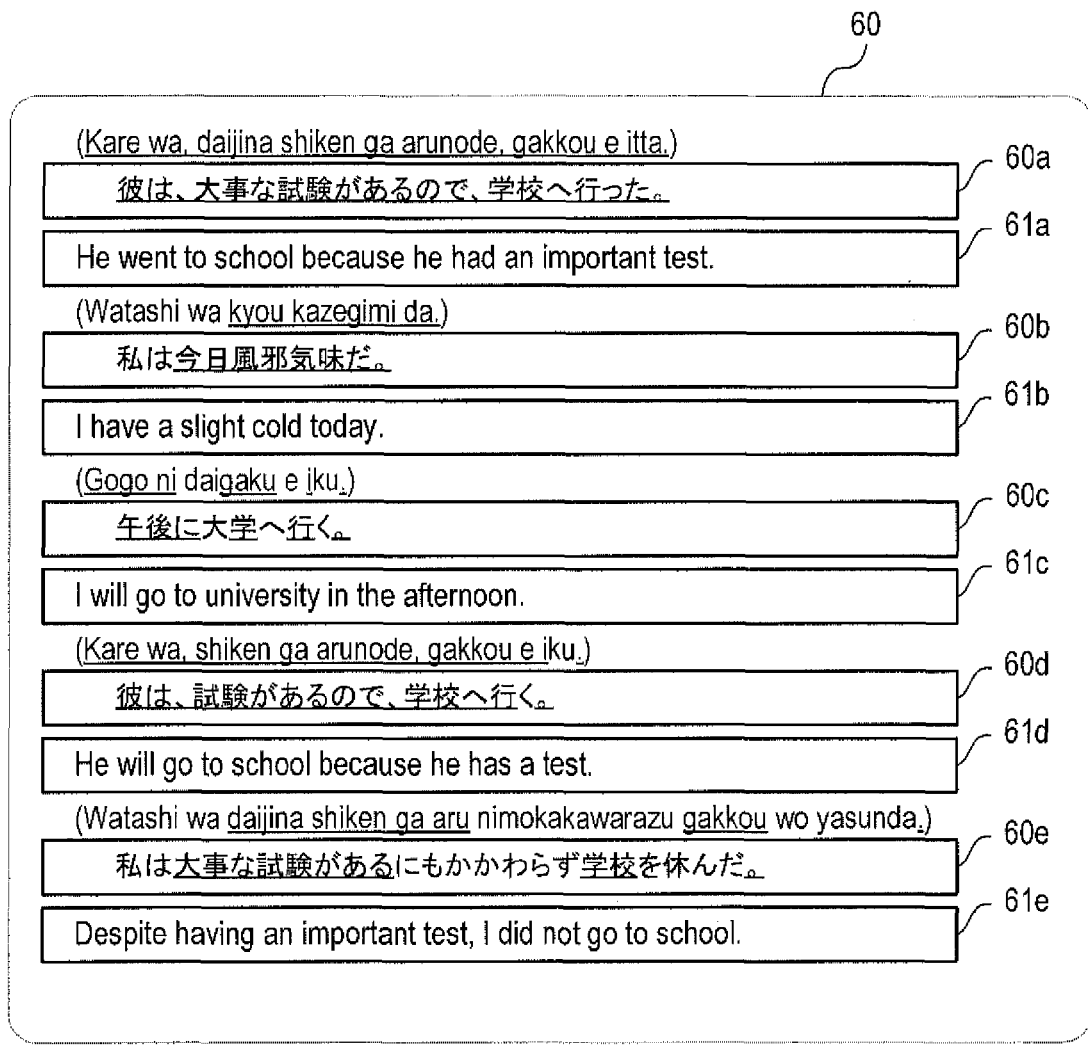
FIG. 12 is a diagram illustrating output example sentences according to the first embodiment.

A process of outputting the example sentence group 30 performed by the example-sentence retrieving apparatus 200 will now be described. FIG. 12 is a diagram illustrating output of example sentences according to this embodiment.

The output unit 200i of the example-sentence retrieving apparatus 200 outputs an example sentence group 60 including translated example sentences corresponding to the retrieval example sentence 30a extracted by the extraction unit 200e and the retrieval example sentences 30d, 30e, 30b, and 30c re-extracted by the re-extraction unit 200h (pairs of the retrieval example sentences (original sentences) and translated sentences) which are output in order of extraction. The example sentence group 60 is output to be displayed in the monitor 11, for example.

An output example sentence 60a "Kare wa, daijina shiken ga arunode, gakkou e itta." and an output translated sentence 61a "He went to school because he had an important test." correspond to the retrieval example sentence 30a. An output example sentence 60b "Watashi wa kyou kazegimi da." and an output translated sentence 61b "I have a slight cold today." correspond to the retrieval example sentence 30d (obtained by $1^{st}$ reevaluation). An output example sentence 60c "Gogo ni daigaku e iku." and an output translated sentence 61c "I will go to university in the afternoon." correspond to the retrieval example sentence 30e (obtained by $2^{nd}$ reevaluation). An output example sentence 60d "Kare wa, shiken ga arunode, gakkou e iku." and an output translated sentence 61d "He will go to school because he has a test." correspond to the retrieval example sentence 30b (obtained by $3^{rd}$ reevaluation). An output example sentence 60e "Watashi wa daijina shiken ga aru nimokakawarazu gakkou wo yasunda." and an output translated sentence 61e "Despite having an important test, I did not go to school." correspond to the retrieval example sentence 30c (obtained by $4^{th}$ reevaluation). Accordingly, it is apparent that the output first three candidates of the example sentence group 60 include most portions of the input example sentence 20, even though the candidates are not output according to a matching score. In other words, if the example sentences are output in order of matching score 42, the output example sentences 60b and 60c become low in rank. In this case, page feeding or scrolling may be required depending on a display region so that the output example sentences 60b and 60c are displayed or the output example sentences 60b and 60c may drop off as the candidates. A translator can pay attention to the phrases "kazegimi" or "pogo" as keywords in these two candidates 30d and 30e that have a low rank based upon a matching score, even though translated phrases corresponding to these phrases are not obtained from the other candidates that might have been ranked higher if based upon a matching score.

As described above, when the example sentence group 30 includes the plurality of example sentences, the entire retrieval key is covered only by candidates which are output in order of extraction and which are high in rank in a balanced manner when compared with a case where the example sentences are output in order of score obtained when the retrieval is performed or in order of matching score 42 obtained when the evaluation is performed by the evaluation unit 200d. The example sentence group 60 especially contributes to an improvement of translation efficiency in a case where translated example sentences are output as results of retrieval as described.

Figure 13:
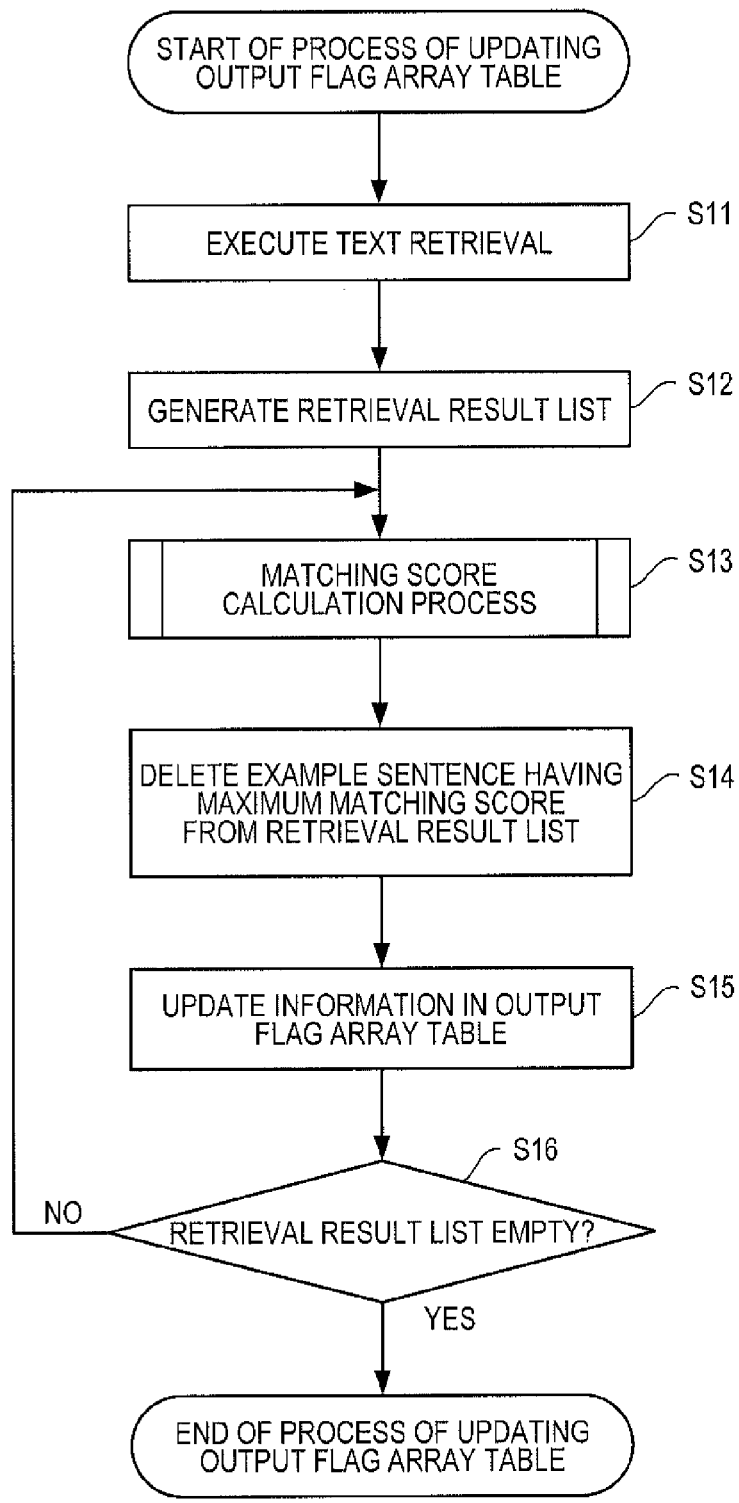
FIG. 13 is a flowchart illustrating a process of updating the output flag array table.

A process of updating the output flag array table 50 will now be described in detail with reference to a flowchart shown in FIG. 13. FIG. 13 is a flowchart illustrating the process of updating the output flag array table 50. The process of updating the output flag array table 50 is executed by the example-sentence retrieving apparatus 200.

In S11, the retrieval unit 200c of the example-sentence retrieving apparatus 200 performs a process of retrieving example sentences stored in the example-sentence storage unit 200b using the input example sentence 110a as a retrieval key.

In S12, the retrieval unit 200c of the example-sentence retrieving apparatus 200 generates a retrieval result list including the example sentence group 110b obtained as a result of the retrieval process.

In S13, the evaluation unit 200d of the example-sentence retrieving apparatus 200 calculates matching scores of the retrieved example sentences 110b and evaluates matching degrees between the input example sentence 110a and the example sentence group 100b on a character-by-character basis.

Note that, although the matching degrees are evaluated on a character-by-character basis in this embodiment, the matching degrees may be evaluated on a word-by-word basis or a sentence segment-by-segment basis, or any combinations thereof, in accordance with morphological analysis. Furthermore, different evaluation methods may be used for different original languages. For example, when English is set as an original language, the matching degrees are evaluated on a word-by-word basis.

In S14, the extraction unit 200e of the example-sentence retrieving apparatus 200 extracts an example sentence having the maximum matching score from the example sentence group 110b as an extraction example sentence 110d. Subsequently, the extraction unit 200e of the example-sentence retrieving apparatus 200 deletes the example sentence corresponding to the extraction example sentence 110d from the retrieval result list.

In S15, the reevaluation portion selection unit 200f of the example-sentence retrieving apparatus 200 updates the output flags in the output flag array table 50.

In S16, the reevaluation portion selection unit 200f of the example-sentence retrieving apparatus 200 determines whether the retrieval result list is empty. When the determination is affirmative, the process of updating the output flag array table 50 is terminated. On the other hand, when the determination is negative, the process returns to S13.

Note that when the process of S16 is performed before the process of S13 is performed, the process of S13 is performed by the reevaluation unit 200g of the example-sentence retrieving apparatus 200. Similarly, when the process of S16 is performed before the process of S14 is performed, the process of S14 is performed by the re-extraction unit 200h of the example-sentence retrieving apparatus 200.

Figure 14:
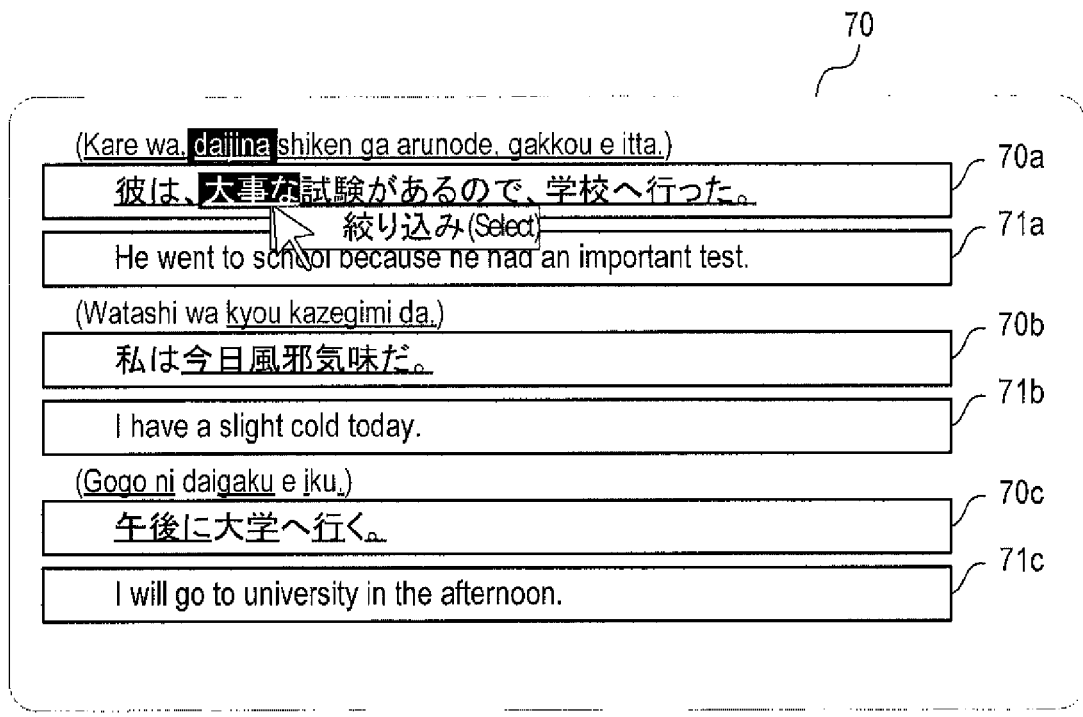
FIG. 14 is a diagram illustrating a selection screen according to the first embodiment.
Figure 15:
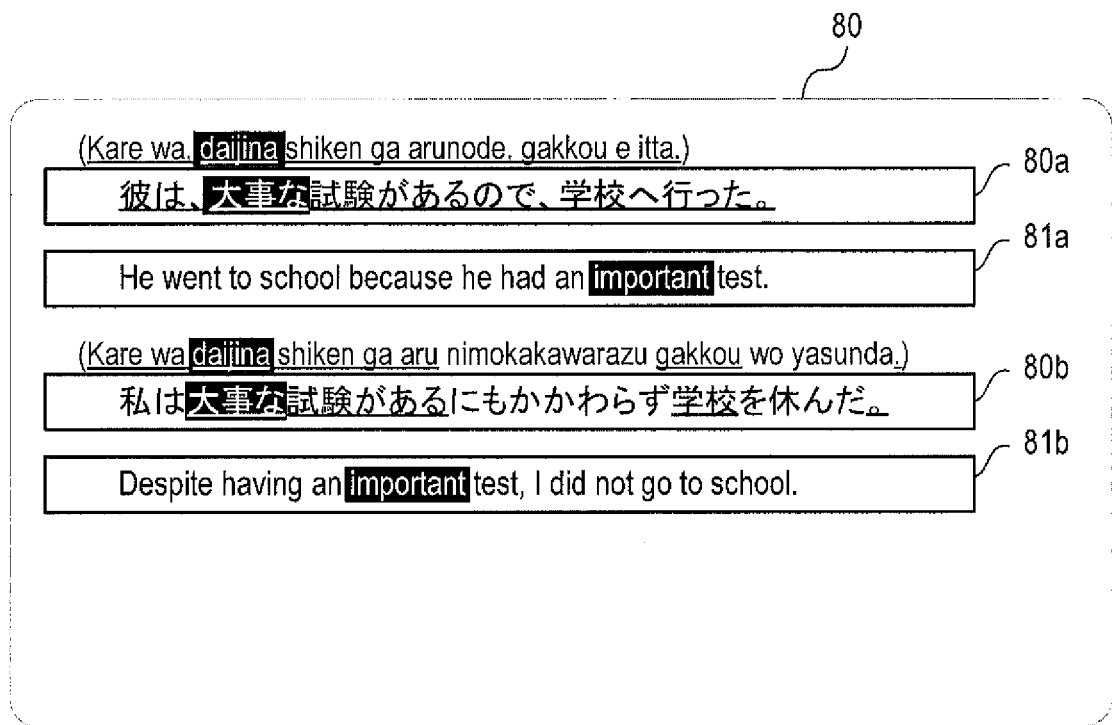
FIG. 15 is a diagram illustrating a selection outputting screen according to the first embodiment.

Next, a case where a selection process is further performed on the example sentence group 60 shown in FIG. 12 will be described with reference to FIGS. 14 and 15. FIG. 14 is a diagram illustrating a selection screen 70 according to this embodiment. FIG. 15 is a diagram illustrating a selection outputting screen 80 according to this embodiment.

The output unit 200i of the example-sentence retrieving apparatus 200 outputs the example sentence group 60 to be displayed in the selection screen 70 in the monitor 11. In general, the number of example sentences which can be displayed at one time is restricted depending on a display region of the monitor 11, for example. The selection screen 70 can display three pairs of bilingual example sentences, that is, output example sentences 70a to 70c and output translated sentences 71a to 71k are displayed.

The output example sentences 70a to 70c include most keywords of the input example sentence 20. However, when output example sentences are to be extracted using a certain keyword, the output example sentences 70a to 70c may be insufficient. Therefore, the translator operates a cursor using the mouse 13 so as to select a character string serving as a keyword. Then, when the translator clicks a selection button, the selection process is performed on the example sentence group 60 or the example sentence group 30 using a character string "daijina" which is highlighted as a keyword.

The example-sentence retrieving apparatus 200 displays the selection outputting screen 80 in the monitor 11 as a result of the selection process. The selection outputting screen 80 displays output example sentences 80a and 80b and output translated sentences 81a and 81b as results of the selection process. Character strings in the original sentences and the translated sentences corresponding to the selected keyword "daijina" are highlighted.

Accordingly, since the output example sentences 70a to 70c displayed in the selection screen 70 include most of the keywords of the input example sentence 20, a sufficiently wide choice of the keywords is displayed for the translator. Furthermore, since the selection process is performed on the results of the retrieval using the keywords of the input example sentence 20, unnecessary retrieval results are not obtained as is seen from the case where the retrieval process is performed simply using the word "daijina" as the keyword. Accordingly, the user who instructs the retrieval process can save time.

For example, a case where example sentences "Kare wa kyuuni handoru wo mawashita.", "Taro wa kyuuni handoru wo kitte, ki ni butukatta.", and "Hanako wa keitaidenwa wo mochinagara handoru wo kitta." are retrieved in response to an input example sentence "Kare wa kyuuni handoru wo kitta." will be described. Note that, when a selection process is performed using a word "kiru" in Kanji, the two example sentences "Taro wa kyuuni handoru wo kitte, ki ni butukatta.", and "Hanako wa keitaidenwa wo mochinagara handoru wo kitta." are selected.

On the other hand, when the retrieval process is merely performed again, various sentences such as "Taro wa toranpu wo kitta." and "Kanojo wa tanka wo kitta." are obtained, and therefore, a long period of time is required for retrieving a desired example sentence.

Figure 16:
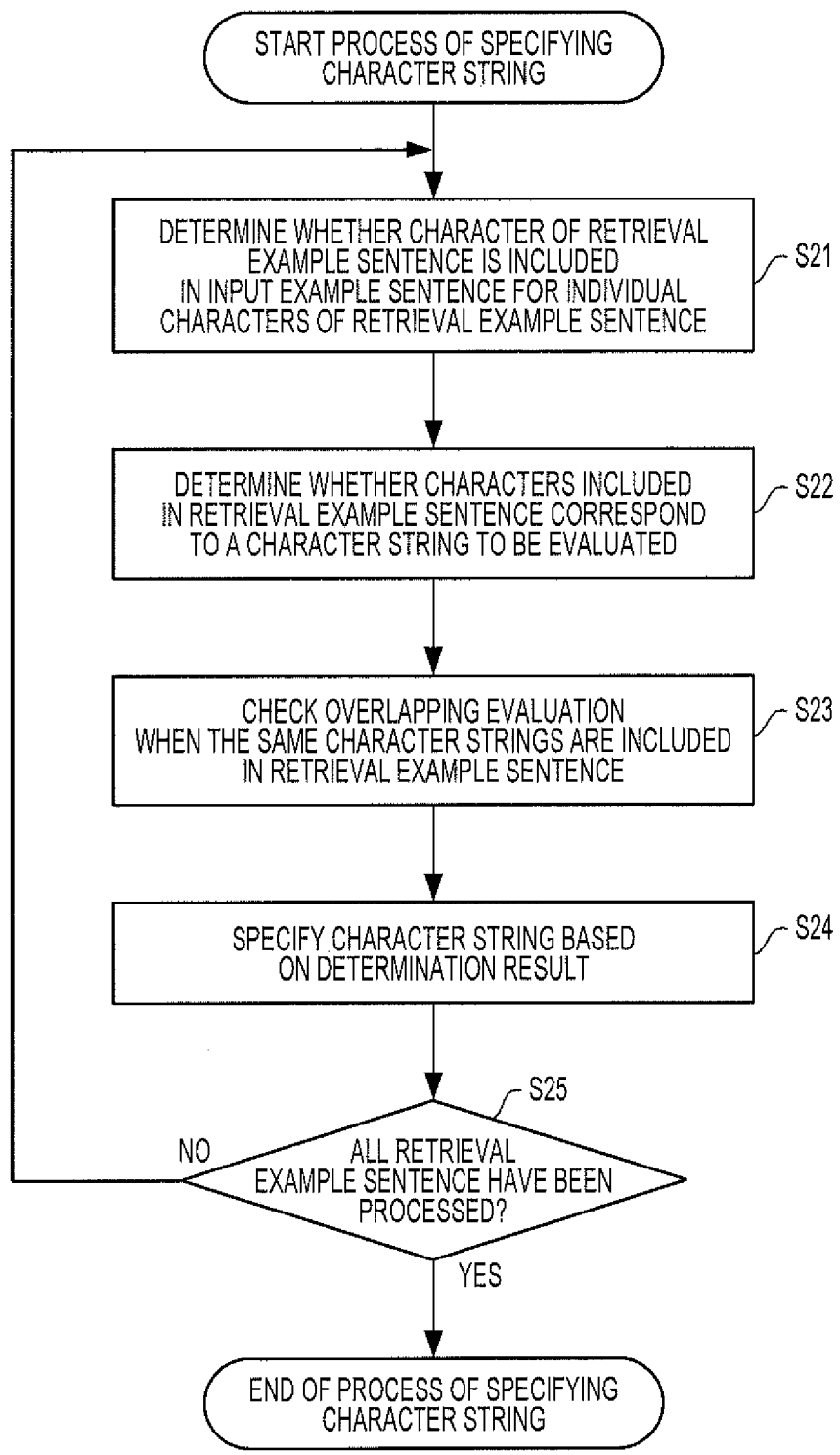
FIG. 16 is a flowchart illustrating a process of specifying a character string.

Next, a process for specifying a character string which matches the retrieval key from the retrieval results will be described. FIG. 16 is a flowchart illustrating the process of specifying a character string. The process of specifying a character string is executed by the example-sentence retrieving apparatus 200. The process is performed, for example, to determine whether the matching flag "1" is set for individual elements of the retrieval-example-sentence arrays 41a to 41g shown in FIG. 6 after the example sentence group 30 is obtained.

In S21, the example-sentence retrieving apparatus 200 determines whether characters included in a retrieval example sentence are included in the input example sentence 100i for individual characters. For example, it is determined whether each of the characters corresponding to the elements of the retrieval-example-sentence array 41a matches any one of the elements of the input-example-sentence array 20a. When the determination is affirmative, the matching flag "1" is assigned to a corresponding element included in a character-string specifying array having a size the same as retrieval-example-sentence array 41a. By this, information representing whether each of the characters included in the retrieval-example-sentence array 41a is included in the input-example-sentence array 20a is set in the character-string specifying array.

In S22, the example-sentence retrieving apparatus 200 determines whether a character block of the retrieval example sentence corresponding to a character block of the input example sentence is to be evaluated. For example, the example-sentence retrieving apparatus 200 determines a size of a character string using an array of consecutive matching flags "1" in the character-string specifying array. When the determination is negative, the matching flags "1" in the character-string specifying array are replaced by matching flags "0". Here, the example-sentence retrieving apparatus 200 determines whether the character string of the retrieval example sentence group corresponds to one of the character strings of the input example sentence 100a so as to determine the character string is to be evaluated. Furthermore, when the determination as to whether the character string of the retrieval example sentence corresponds to one of the character strings of the input example sentence 100a may be made with reference to a dictionary. Moreover, the retrieval unit 200c which performed the retrieval process may use information (inheritance of information on a list of matching portions) used in the retrieval process as information for making the determination.

In S23, when character strings included in the retrieval example sentence overlap with each other, the example-sentence retrieving apparatus 200 determines whether a process of avoiding overlapping is to be performed. For example, when an identical character string appears several times and when it is determined that such several appearances are redundant, the matching flags "1" of the character-string specifying array are changed to the matching flags "0" in order to prevent overevaluation when the matching scores are evaluated later.

In S24, the example-sentence retrieving apparatus 200 sets the matching flags "1" of the character-string specifying array obtained on the basis of the determinations made in S21 to S23 as matching flags "1" in the elements of the retrieval-example-sentence array 41a.

In S25, when the process of specifying a character string has not been performed on at least one of the example sentences of the example sentence group 30, the process returns to S21 and the example-sentence retrieving apparatus 200 performs the same process on the next one of the example sentences in example sentence group 30. When the process of specifying a character string has been performed on all the example sentences of the example sentence group 30, the process of specifying a character string is terminated.

Next, a second embodiment will be described. The second embodiment is different from the first embodiment in that an example-sentence retrieving apparatus 200 reevaluates an example sentence group 30 using an output frequency array in addition to an output flag array. The second embodiment will be described hereinafter with reference to FIGS. 17 to 26.

Figure 17:
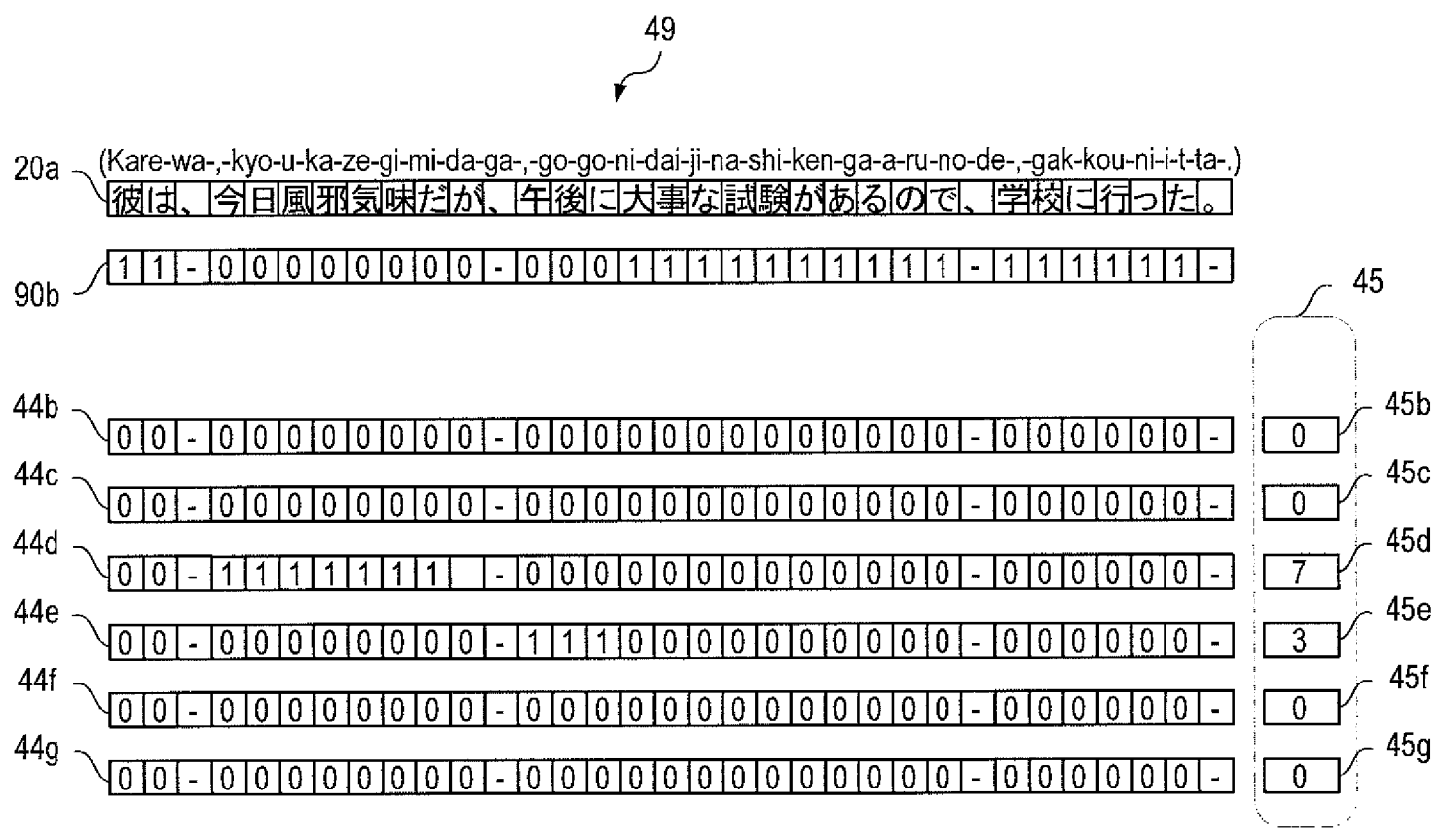

FIG. 17 is a diagram illustrating a matching frequency table 49 according to the second embodiment.

A process of evaluating the example sentence group 30 performed by the example-sentence retrieving apparatus 200 is the same as that in the foregoing embodiment, and therefore, detailed description thereof is omitted, and a process to be performed after a retrieval example sentence 30a "Kare wa, daijina shiken ga arunode, gakkou e itta." is extracted will be described. In the matching frequency table 49, a retrieved-example sentence array corresponding to the retrieval example sentence 30a which has been extracted is omitted.

The matching frequency array 49 includes an input-example-sentence array 20a, a retrieval-example-sentence array 44a (not shown), and retrieval-example-sentence arrays 44b to 44g. The input-example-sentence array 20a includes characters of an input example sentence 20, and elements of the array serve as reference elements of evaluation of scores (scores of the elements). The retrieval-example-sentence array 44b includes characters of a retrieval example sentence 30b. Elements of the retrieval-example-sentence array 44b are subjected to score evaluation using the corresponding elements of the input example sentence 20. The retrieval-example-sentence array 44b is subjected to score evaluation (refer to a matching score 45) using results of the score evaluation performed on the array elements. Accordingly, the elements of the retrieval-example-sentence array 44b are to be subjected to the score evaluation. Similarly, the retrieval-example-sentence arrays 44c to 44g correspond to the retrieval example sentences 30c to 30g. Matching evaluation is performed through a process of calculating matching scores which will be described hereinafter.

Then, results of the score evaluation performed on the retrieval-example-sentence arrays 44b to 44g are represented by the matching score 45 (matching scores 45b to 45g). The score evaluation is performed in the process of calculating matching scores. Note that score evaluation values of the elements of the retrieval-example-sentence array 41a are "0" in an initial state.

An output frequency array 90b is updated when the retrieval example sentence 30a is extracted as an extraction example sentence. The example-sentence retrieving apparatus 200 refers to elements of the output frequency array 90b and the retrieval example sentence 30a corresponding to the elements of the output frequency array 90b. When at least one of the elements of the output frequency array 90b match at least one of the retrieval example sentence 30a corresponding to the elements of the output frequency array 90b, an output frequency level of "1" is added to the element of the output frequency array 90b. The output frequency levels of the elements of the output frequency array 90b represent frequencies in which the corresponding elements of the input-example-sentence array 20a are reflected in the extraction of the example sentence from the example sentence group 30. Therefore, the output frequency levels of the elements of the output frequency array 90b are used to select reevaluation portions of the example sentence group 30 (except for the retrieval example sentence 30a which has been extracted) by weighting the reevaluation portions.

Then, each of the retrieval-example-sentence arrays 44b to 44g is subjected to the score evaluation (reevaluation), and a result of the score evaluation is shown as the matching score 45 (matching scores 45b to 45g). In the matching scores 45b to 45g, the maximum value is "7" (the matching score 45d). The example-sentence retrieving apparatus 200 re-extracts the retrieval example sentence 30d "Watashi wa kyou kazegirni da." as a re-extraction example sentence.

Figure 26:
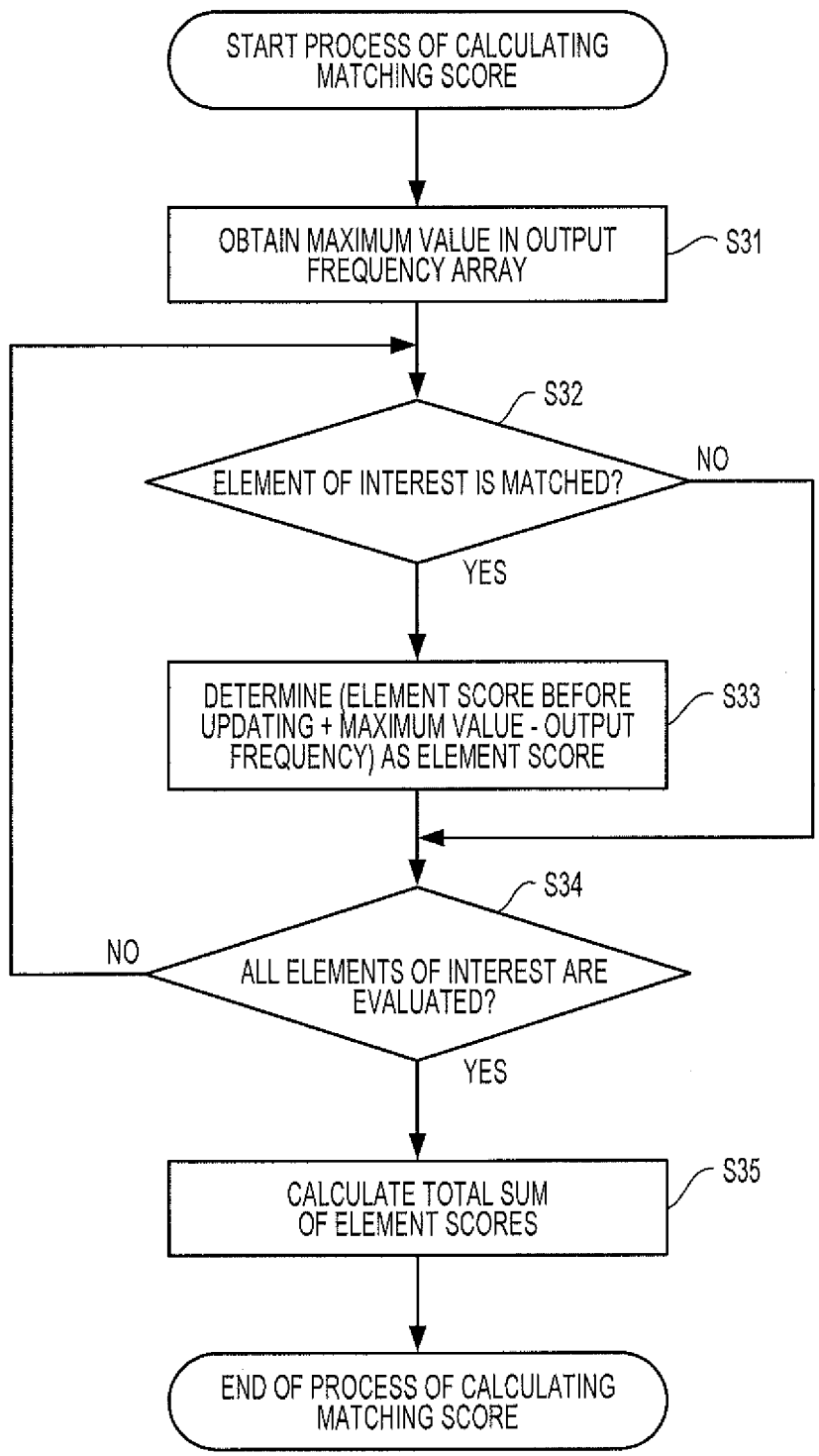
FIG. 26 is a flowchart illustrating a process of calculating a matching score.

Here, a process of calculating a matching score will be described with reference to FIG. 26. FIG. 26 is a flowchart illustrating the process of calculating a matching score. The process of calculating a matching score is performed by the reevaluation unit 200g of the example-sentence retrieving apparatus 200.

In S31, the reevaluation unit 200g of the example-sentence retrieving apparatus 200 obtains the maximum value in an output frequency array. For example, in the output frequency array 90b shown in FIG. 17, the maximum value is "1", in an output frequency array 90d shown in FIG. 19, the maximum value is "2", and in the output frequency array 90e shown in FIG. 25, the maximum value is "4".

In S32, the reevaluation unit 200g of the example-sentence retrieving apparatus 200 determines whether any one of the elements of the input example sentence 20 corresponds to any one of elements of a retrieval-example-sentence array. When the determination is negative, the reevaluation unit 200g of the example-sentence retrieving apparatus 200 proceeds to S34. On the other hand, when the determination is affirmative, the reevaluation unit 200g of the example-sentence retrieving apparatus 200 proceeds to S33.

In S33, the reevaluation unit 200g of the example-sentence retrieving apparatus 200 performs the score evaluation on the array elements. In the score evaluation, for each of the array elements, differences between output frequencies of the elements in the output frequency array and the maximum value are evaluated as element scores, and adding and updating are performed.

In S34, the reevaluation unit 200g of the example-sentence retrieving apparatus 200 proceeds to S35 after the score evaluation is performed on all the array elements. The reevaluation unit 200g of the example-sentence retrieving apparatus 200 returns to S32 if at least one of the array elements has not been subjected to the score evaluation.

In S35, the reevaluation unit 200g of the example-sentence retrieving apparatus 200 obtains a matching score which is a total sum of score evaluation values of the array elements.

Figure 18:
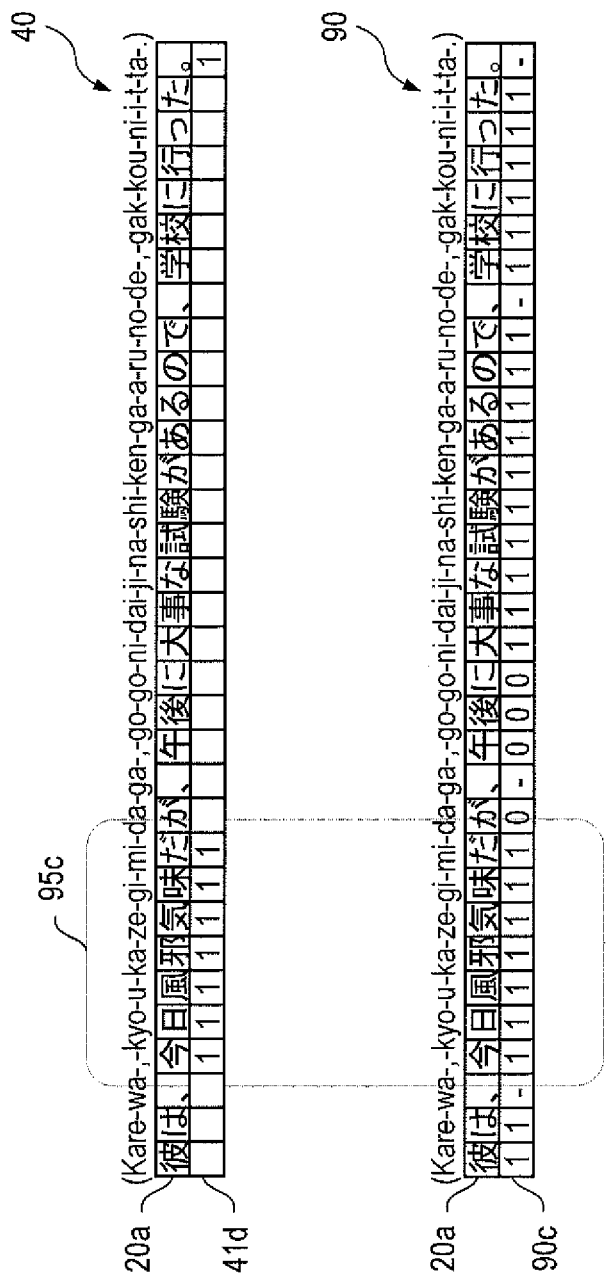
FIG. 18 is a diagram illustrating an updated state of an output flag array table according to the second embodiment.

Next, a process of updating an output frequency array table performed by the example-sentence retrieving apparatus 200 will be described. FIG. 18 is a diagram illustrating an updated state of an output frequency array table 90 according to the second embodiment.

The example-sentence retrieving apparatus 200 updates an update frequency array 90c of the output frequency array table 90 when re-extracting the retrieval example sentence 30d as the re-extraction example sentence. The example-sentence retrieving apparatus 200 refers to the elements of the retrieval-example-sentence array 41d (refer to FIG. 6) corresponding to the retrieval example sentence 30d. When matching flags of certain elements of the retrieval-example-sentence array 41d represent "1", output frequency values "1" are added to corresponding elements (a matching portion 95c) of the update frequency array 90c. In other words, the output frequency levels of the elements of the update frequency array 90c represent frequencies in which example sentences are extracted from the example sentence group 30 on a sentence character block basis, which is obtained by reflecting the frequencies of character blocks in the example sentence group 30 in corresponding elements of the input-example-sentence array 20a.

Figure 19:
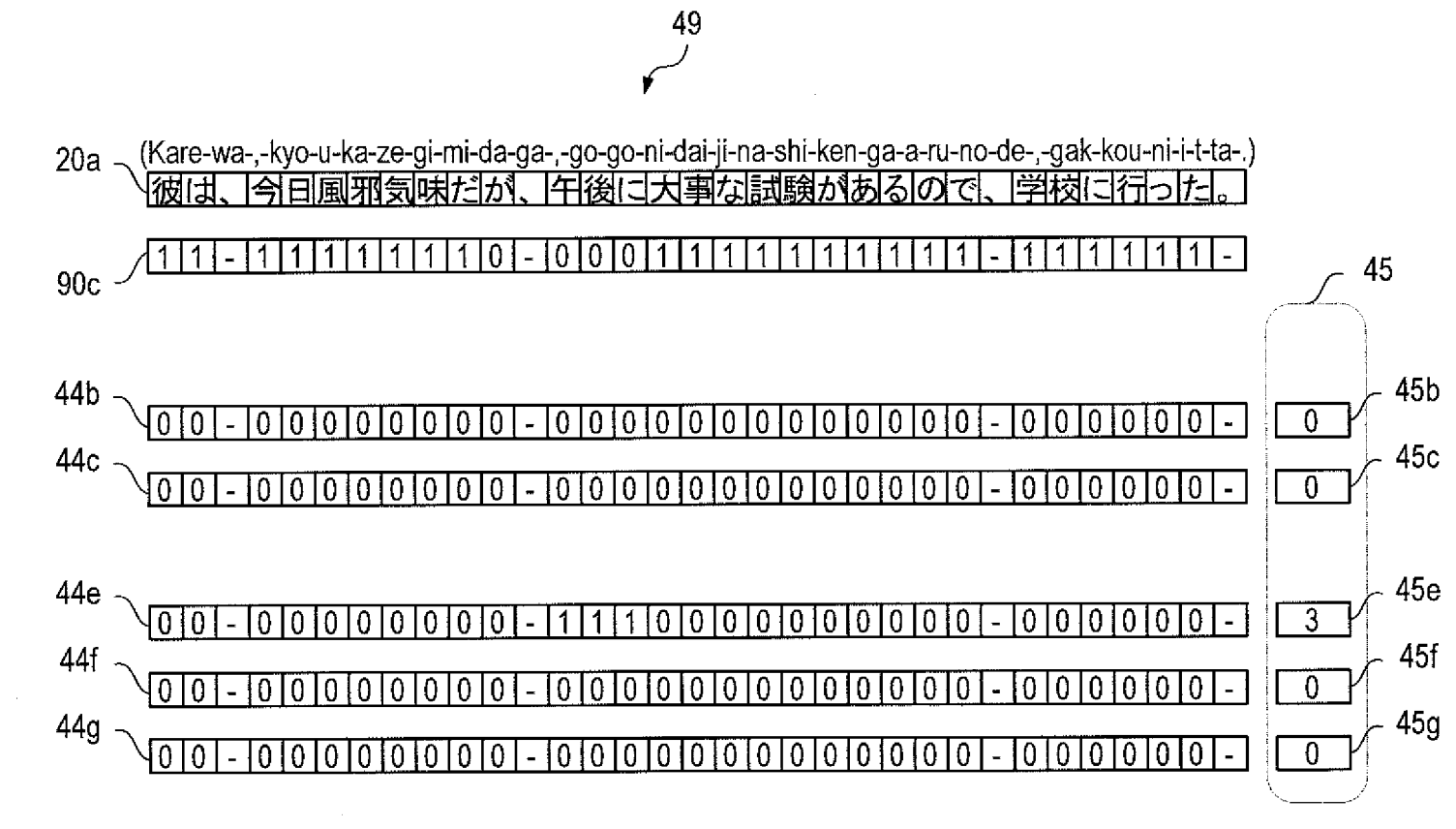

A second reevaluation of the example sentence group 30 performed by the example-sentence retrieving apparatus 200 will now be described. FIG. 19 is a diagram illustrating a matching frequency table 49 according to the second embodiment.

In the matching frequency table 49, the retrieval-example-sentence array 44a corresponding to the retrieval example sentence 30a which has been extracted and the retrieval-example-sentence array 44d corresponding to the retrieval example sentence 30d which has been re-extracted are omitted. The reevaluation unit 200g of the example-sentence retrieving apparatus 200 performs the score evaluation (second reevaluation) on each of the retrieval-example-sentence arrays 44b, 44c, and 44e to 44g. A total sum of the scores is represented in the matching score 45 (45b, 45c, and 45e to 45g). According to the matching score 45, among the matching scores 45b, 45c, and 45e to 45g, the maximum value is "3". Accordingly, the example-sentence retrieving apparatus 200 re-extracts the retrieval example sentence 30e "Gogo ni daigaku e iku." as a re-extraction example sentence.

Figure 20:
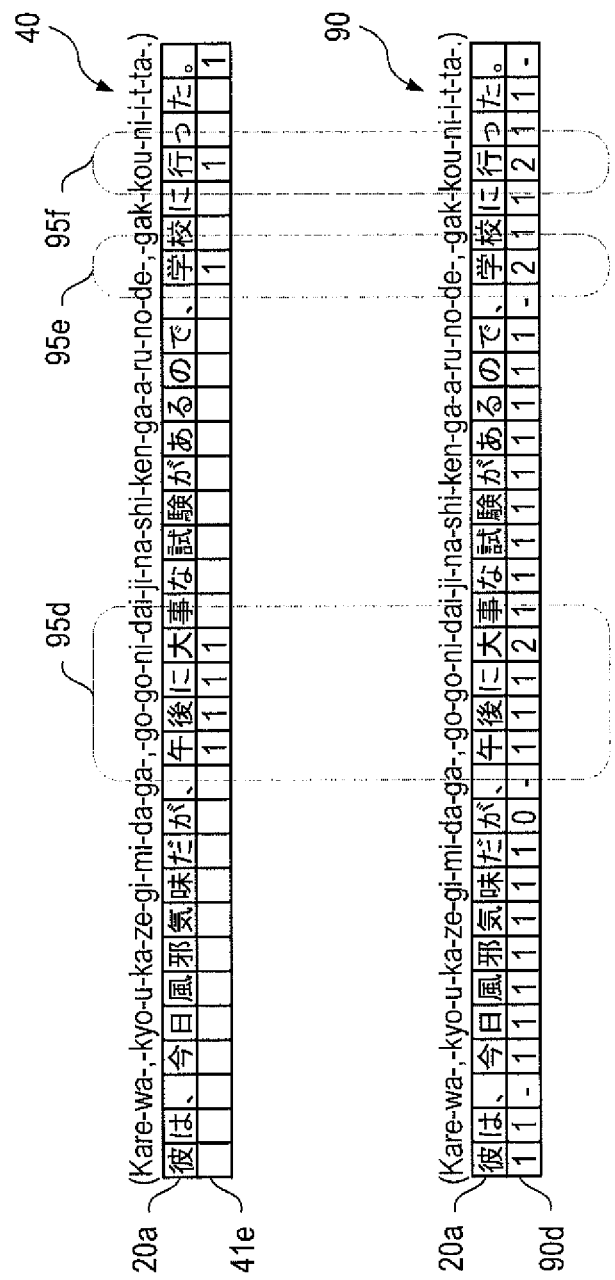
FIG. 20 is a diagram illustrating an updated state of an output flag array table according to the second embodiment.

A second update of the output frequency array table 90 performed by the example-sentence retrieving apparatus 200 will now be described. FIG. 20 is a diagram illustrating an updated state of the output frequency array table 90 according to the second embodiment.

The example-sentence retrieving apparatus 200 updates the output frequency array 90d of the output frequency array table 90 when re-extracting the retrieval example sentence 30e as the re-extraction example sentence. The example-sentence retrieving apparatus 200 refers to the elements of the retrieval-example-sentence array 41e (refer to FIG. 6) corresponding to the retrieval example sentence 30e. When the matching flags of certain elements of the retrieval-example-sentence array 41e represent "1", an output frequency value "1" is added to corresponding elements (matching portions 95d, 95e, and 95f) of the output frequency array 90d.

Figure 21:
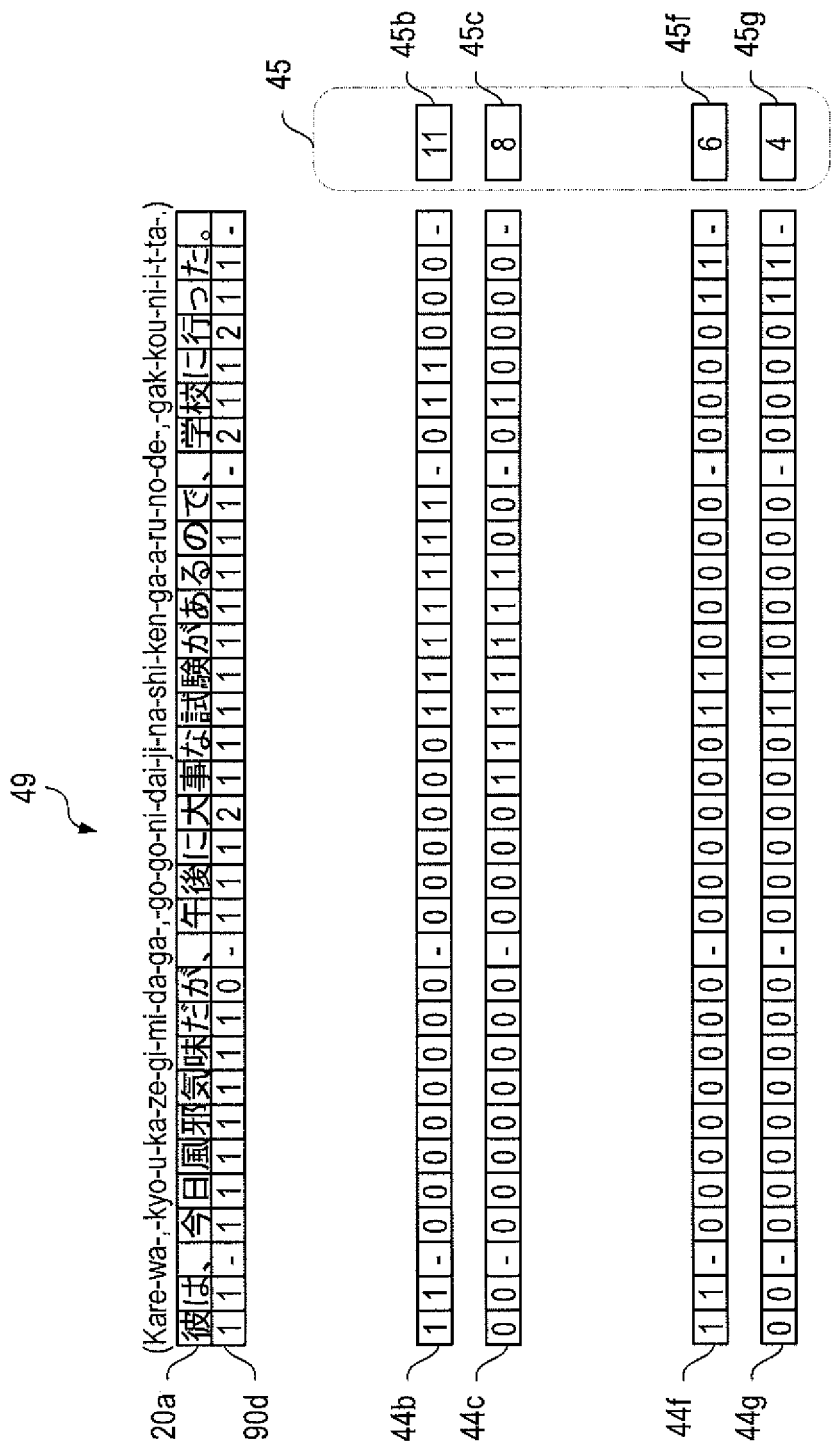
FIG. 21 is a diagram illustrating a matching table according to the second embodiment.

A process of a third reevaluation of the example sentence group 30 performed by the example-sentence retrieving apparatus 200 will now be described. FIG. 21 is a diagram illustrating the matching frequency table 49 according to the second embodiment.

In the matching frequency table 49, the retrieval-example-sentence array 44a corresponding to the retrieval example sentence 30a which has been extracted and the retrieval-example-sentence arrays 44d and 44e corresponding to the retrieval example sentences 30d and 30e which have been re-extracted are omitted. The reevaluation unit 200g of the example-sentence retrieving apparatus 200 performs the score evaluation (third reevaluation) on each of the retrieval-example-sentence arrays 44b, 44c, 44f, and 44g. A total sum of the scores is represented in the matching score 45 (45b, 45c, 45f, and 45g). According to the matching score 45, among the matching scores 45b, 45c, 45f, and 45g, the maximum value is "11". Accordingly, the example-sentence retrieving apparatus 200 re-extracts the retrieval example sentence 30b "Kare wa, shiken ga arunode, gakkou e iku." as a re-extraction example sentence.

Figure 22:
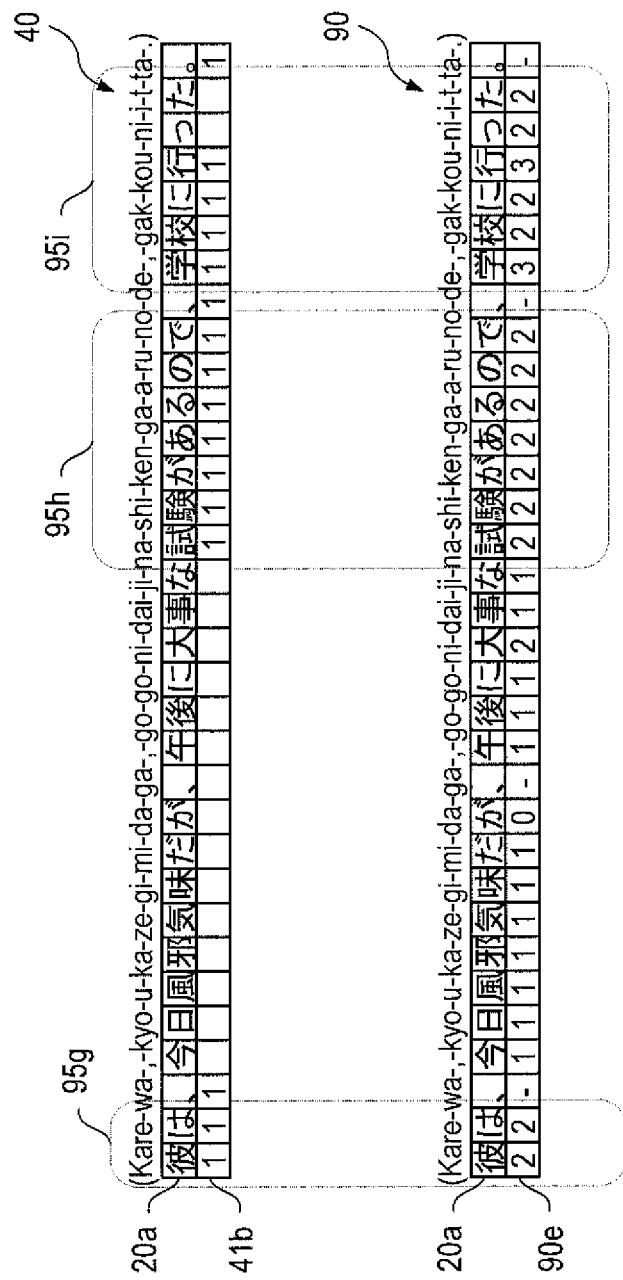
FIG. 22 is a diagram illustrating an updated state of an output flag array table according to the second embodiment.

A third update of the output frequency array table 90 performed by the example-sentence retrieving apparatus 200 will now be described. FIG. 22 is a diagram illustrating an updated state of the output frequency array table 90 according to the second embodiment.

The example-sentence retrieving apparatus 200 updates the output frequency array 90e of the output frequency array table 90 when re-extracting the retrieval example sentence 30b as the re-extraction example sentence. The example-sentence retrieving apparatus 200 refers to the elements of the retrieval-example-sentence array 41b (refer to FIG. 6) corresponding to the retrieval example sentence 30b. When the matching flags of certain elements of the retrieval-example-sentence array 41b represent "1", an output frequency value "1" is added to corresponding elements (matching portions 95g, 95h, and 95i) of the output frequency array 90e.

Figure 23:
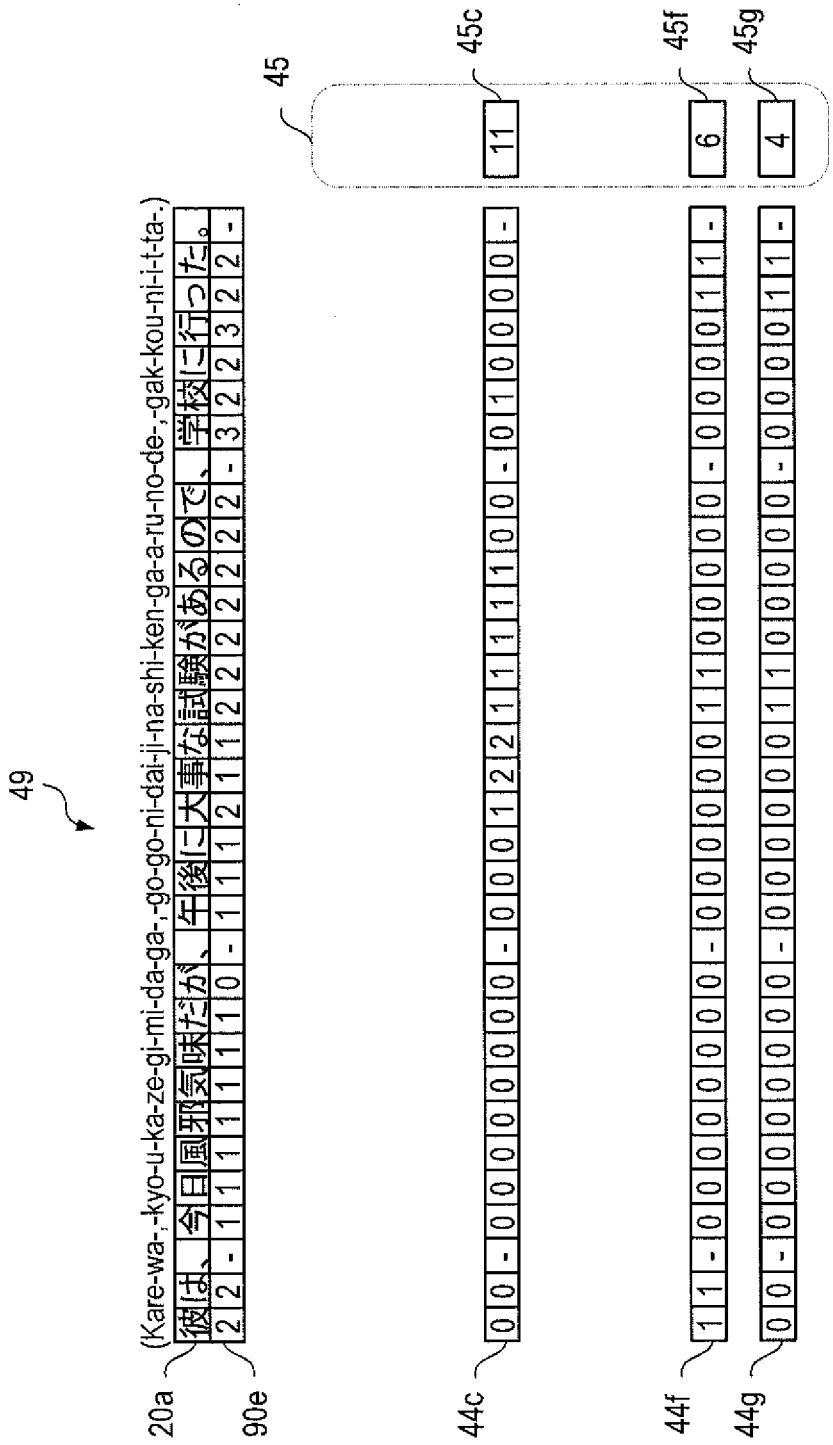
FIG. 23 is a diagram illustrating a matching table according to the second embodiment.

A process of a fourth reevaluation of the example sentence group 30 performed by the example-sentence retrieving apparatus 200 will now be described. FIG. 23 is a diagram illustrating the matching frequency table 49 according to the second embodiment.

In the matching frequency table 49, the retrieval-example-sentence array 44a corresponding to the retrieval example sentence 30a which has been extracted and the retrieval-example-sentence arrays 44d, 44e, and 44b corresponding to the retrieval example sentences 30d, 30e, and 30b which have been re-extracted are omitted. The reevaluation unit 200g of the example-sentence retrieving apparatus 200 performs the score evaluation (fourth reevaluation) on each of the retrieval-example-sentence arrays 44c, 44f, and 44g. A total sum of the scores is represented in the matching score 45 (45c, 45f, and 45g). According to the matching score 45, among the matching scores 45c, 45f, and 45g, the maximum value is "11". Accordingly, the example-sentence retrieving apparatus 200 re-extracts the retrieval example sentence 30c "Watashi wa daijina shiken ga aru nimokakawarazu gakkou wo yasunda," as a re-extraction example sentence.

Figure 24:
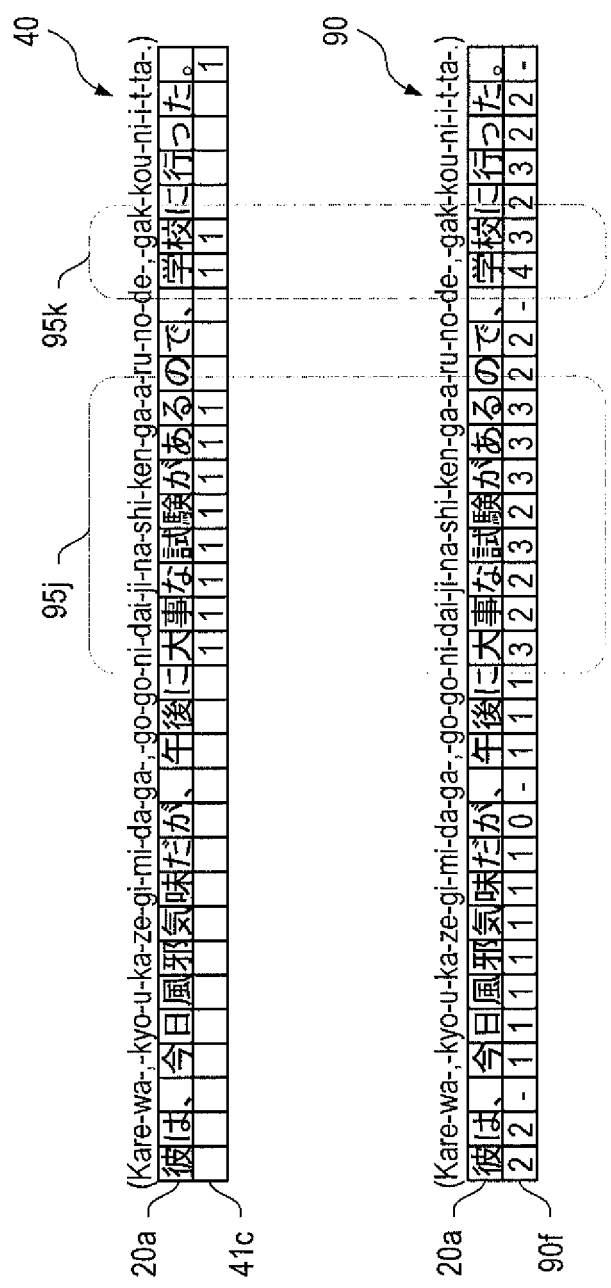
FIG. 24 is a diagram illustrating an updated state of an output flag array table according to the second embodiment.

A fourth update of the output frequency array table 90 performed by the example-sentence retrieving apparatus 200 will now be described. FIG. 24 is a diagram illustrating an updated state of the output frequency array table 90 according to the second embodiment.

The example-sentence retrieving apparatus 200 updates the output frequency array 90f of the output frequency array table 90 when re-extracting the retrieval example sentence 30c as the re-extraction example sentence. The example-sentence retrieving apparatus 200 refers to the elements of the retrieval-example-sentence array 41c (refer to FIG. 6) corresponding to the retrieval example sentence 30c. When the matching flags of certain elements of the retrieval-example-sentence array 41b represent "1", an output frequency value "1" is added to corresponding elements (matching portions 95j and 95k) of the output frequency array 90f.

Figure 25:
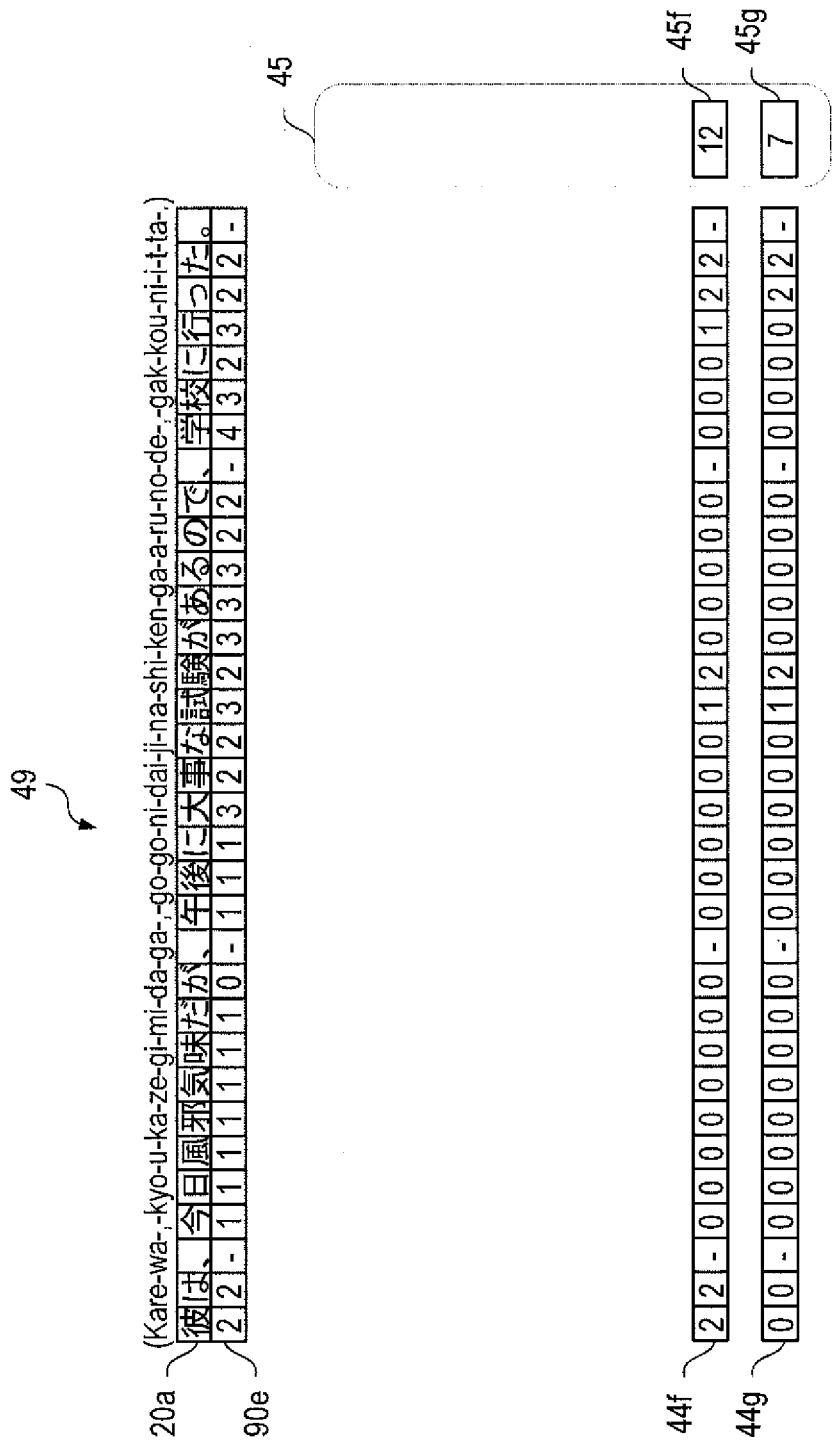
FIG. 25 is a diagram illustrating a matching table according to the second embodiment.

A process of a fifth reevaluation of the example sentence group 30 performed by the example-sentence retrieving apparatus 200 will now be described. FIG. 25 is a diagram illustrating the matching frequency table 49 according to the second embodiment.

In the matching frequency table 49, the retrieval-example-sentence array 44a corresponding to the retrieval example sentence 30a which has been extracted and the retrieval-example-sentence arrays 44d, 44e, 44b, and 44c corresponding to the retrieval example sentences 30d, 30e, 30b, and 30c which have been re-extracted are omitted. The reevaluation unit 200g of the example-sentence retrieving apparatus 200 performs the score evaluation (fifth reevaluation) on each of the retrieval-example-sentence arrays 44f and 44g. A total sum of the scores is represented in the matching score 45 (45f and 45g). According to the matching score 45, between the matching scores 45f and 45g, the maximum value is "12". Accordingly, the example-sentence retrieving apparatus 200 re-extracts the retrieval example sentence 30f "Kare wa shiken wo ukeni daigaku e itta." as a fifth re-extraction example sentence Note that the retrieval example sentence 30g "Watashi wa daigaku e ittaga shiken wa ukenakatta." is extracted as the last re-extraction example sentence.

As described above, since the matching frequency is reflected in the evaluation, even when the number of example sentences included in the example sentence group 30 is large, ranking can be appropriately assigned to all the example sentences included in the example sentence group 30.

Note that, although the update of the output frequency arrays is performed by adding "1", a value obtained by weighting in accordance with the number of times in which an example sentence is extracted, an output frequency level, or a specific keyword (for example, a selected keyword) may be added. In such an addition method, ranking is appropriately assigned as desired.

Figure 27:
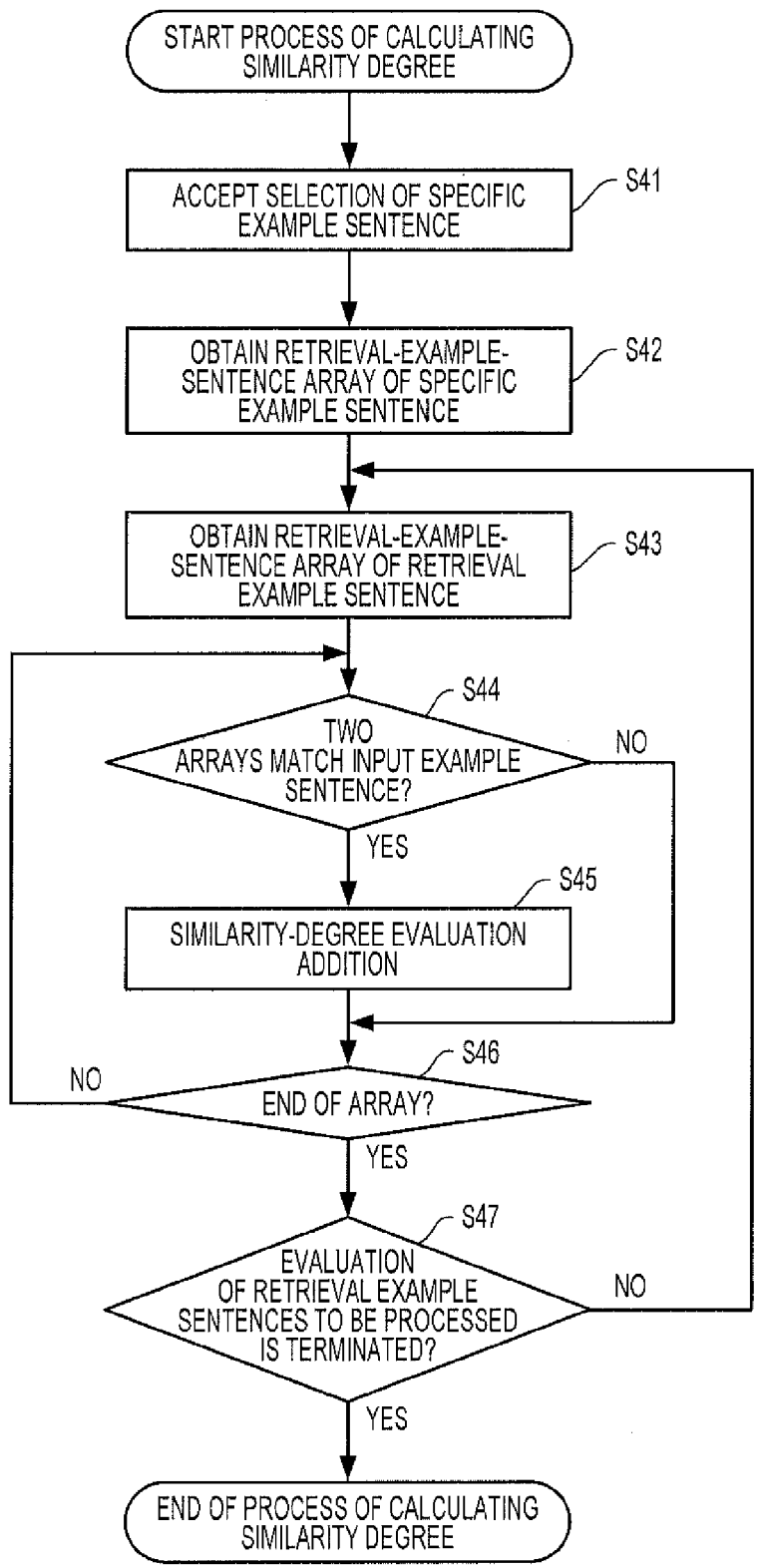
FIG. 27 is a flowchart illustrating a process of calculating a similarity level.

Next, a third embodiment will be described. A case where an order of output of an example sentence group 60 is changed will be described with reference to FIG. 27. FIG. 27 is a flowchart illustrating a process of calculating a similarity level. The process of calculating a similarity level is performed by the example-sentence retrieving apparatus 200. The process is performed, for example, after the example sentence group 60 is obtained.

In S41, an example-sentence retrieving apparatus 200 accepts a selection of a specific example sentence from the example sentence group 60 (extraction example sentences and re-extraction example sentences).

In S42, the example-sentence retrieving apparatus 200 obtains a retrieval-example-sentence array 41 of the specific example sentence.

In S43, the example-sentence retrieving apparatus 200 obtains a retrieval-example-sentence array 41 of the example sentence group 30.

In S44, the example-sentence retrieving apparatus 200 determines whether the retrieval-example-sentence array 41 of the specific example sentence matches the input example sentence 20 and the retrieval-example-sentence array 41 of the example sentence group 30 matches the input example sentence 20. The example-sentence retrieving apparatus 200 performs the determination for individual elements included in the retrieval-example-sentence arrays 41. When the determination is affirmative, the example-sentence retrieving apparatus 200 proceeds to S45 whereas when the determination is negative, the example-sentence retrieving apparatus 200 proceeds to S46.

In S45, the example-sentence retrieving apparatus 200 adds "1" to a similarity evaluation value.

In S46, the example-sentence retrieving apparatus 200 determines whether an end of the retrieval-example-sentence array 41 of the specific example sentence has been reached so as to determine whether the matching determination has been performed on the end of the retrieval-example-sentence array 41 of the specific example sentence. When the determination is affirmative in S46, the example-sentence retrieving apparatus 200 proceeds to S47 whereas when the determination is negative in S46, the example-sentence retrieving apparatus 200 returns to S44.

In S47, the example-sentence retrieving apparatus 200 determines whether all the example sentences included in the example sentence group 30 (except for the specific example sentence) have been evaluated. When the determination is negative in S47, the example-sentence retrieving apparatus 200 returns to S43 whereas when the determination is affirmative in S47, the example-sentence retrieving apparatus 200 terminates the process of calculating a similarity level.

In this way, similarity levels between the example sentence group 30 and the specific example sentence can be evaluated. In addition, by changing an order of arrangement of the example sentence group 60 in accordance with the similarity evaluation, a desired order for outputting the example sentence group 60 can be obtained.

According to an aspect of an embodiment, the output unit translates an input sentence 100a according to the above described extraction and re-extraction of example sentences 100b.

Note that a function of performing the process described above may be realized by a computer. In this case, a program which describes content of the process of the function to be included in the example-sentence retrieving apparatus is supplied. The function of performing the process is realized in the computer when the program is executed by the computer. The program including the content of the process may be recorded in a computer readable recording medium. Examples of the computer readable recording medium include a magnetic recording device, an optical disc, a magneto-optical recording medium, and a semiconductor memory. Examples of the magnetic recording device include a hard disk device (HDD), a flexible disk (FD), and a magnetic tape. Examples of the optical disc include a DVD (Digital Versatile Disc), a DVD-RAM (Digital Versatile Disc Random Access Memory), a DVD-ROM (Digital Versatile Disc Read Only Memory), a CD-R (Compact Disc Recordable), and a CD-RW (Compact Disc ReWritable).

When the program is distributed, portable recording media which store the program, such as DVDs and CD-ROMs, are sold. Alternatively, the program may be stored in a storage unit included in a server computer, and the program may be transmitted from the server computer to another computer through a network.

The computer which executes the program stores the program stored in the portable recording medium or the program transmitted from the server computer in a storage unit of itself. Then, the computer reads the program from the storage unit and executes the process in accordance with the program. Note that the computer may directly read the program from the portable recording medium and execute the process in accordance with the program. Alternatively, the computer may execute processes in accordance with programs every time such programs are transmitted from the server computer.

Therefore, according to an aspect of the embodiments of the invention, any combinations of one or more of the described features, functions, operations, and/or benefits can be provided. A combination can be one or a plurality. The embodiments can be implemented as an apparatus (a machine) that includes computing hardware (i.e., computing apparatus), such as (in a non-limiting example) any computer that can store, retrieve, process and/or output data and/or communicate (network) with other computers, such as computer 100. According to an aspect of an embodiment, the described features, functions, operations, and/or benefits can be implemented by and/or use computing hardware and/or software. The apparatus (e.g., the retrieval result outputting apparatus 100, the example-sentence retrieving apparatus 200) can be according to the computer 100. In addition, a computer processor can include one or more computer processors in one or more apparatuses or any combinations of one or more computer processors and/or apparatuses. In addition, a unit can refer to as a function implemented by a computer processor and/or a unit can be one or more computer processors and/or devices including one or more computer processors that execute a function. An aspect of an embodiment relates to causing one or more apparatuses and/or computer processors to execute the described operations.

A program/software implementing the embodiments may be recorded on computer-readable recording media. The program/software implementing the embodiments may also be included/encoded as a data signal and transmitted over transmission communication media. A data signal moves on transmission communication media, such as wired network or wireless network, for example, by being incorporated in a carrier wave. The data signal may also be transferred by a so-called baseband signal. A carrier wave can be transmitted in an electrical, magnetic or electromagnetic form, or an optical, acoustic or any other form.

Note that the foregoing embodiments may be modified without departing from the scope of the embodiments.

Furthermore, various modifications and changes of the foregoing embodiments may be made by those who skilled in the art, and the foregoing embodiments are not limited to the configurations and the application examples described above.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A retrieval result outputting apparatus which outputs a result of example-sentence retrieval, comprising:
   a computer processor to execute:
      evaluating degrees of matching on a character block basis between an input sentence and example sentences retrieved using the input sentence as a retrieval condition;
      extracting one of the retrieved example sentences as an extracted example sentence in accordance with the evaluation;
      selecting, as a reevaluation portion, a portion of the input sentence other than a portion that contributed to the evaluating for the extracting of the example sentence;
      reevaluating degrees of matching on a character block basis between the retrieved example sentences and the reevaluation portion of the input sentence;
      re-extracting another of the retrieved example sentences as a re-extracted example sentence in accordance with the reevaluation; and
      outputting the extracted and re-extracted example sentences.

2. The retrieval result outputting apparatus according to claim 1, wherein the selecting further selects, as a reevaluation portion, a portion of the input sentence other than a portion that contributed to an evaluation for extraction of an example sentence and/or other than a portion that contributed to a re-evaluation for re-extraction of a re-extracted example sentence.

3. The retrieval result outputting apparatus according to claim 1, the computer processor is further capable of recording information on a character block basis on a contribution to the evaluation of the extracted example sentence as an extraction record of the input sentence, and selects the reevaluation portion with reference to the extraction record.

4. The retrieval result outputting apparatus according to claim 1, wherein the example sentences correspond to original sentences written in a certain original language, and
   the outputting outputs pairs of the original sentences and translated sentences thereof as bilingual example sentences.

5. A method for outputting a retrieval result employed in a retrieval result outputting apparatus which outputs a result of example-sentence retrieval, the method comprising:
   evaluating degrees of matching on a character block basis between an input sentence and example sentences retrieved using the input sentence as a retrieval condition;
   extracting, by a processor, a retrieved example sentence as an extracted example sentence in accordance with the evaluation;
   selecting, as a reevaluation portion, a portion of the input sentence other than a portion that contributed to the evaluating for the extracting of the example sentence;
   reevaluating degrees of matching on a character block basis between the retrieved example sentences and the reevaluation portion of the input sentence;
   re-extracting another retrieved example sentence as a re-extracted example sentence in accordance with the reevaluation; and
   outputting the extracted example sentence and the re-extracted example sentence.

6. A computer-readable recording medium which records a retrieval-result outputting program which makes a computer execute:
   evaluating degrees of matching on a character block basis between an input sentence and example sentences retrieved using the input sentence as a retrieval condition;
   extracting a retrieved example sentence as an extracted example sentence in accordance with the evaluation;
   selecting, as a reevaluation portion, a portion of the input sentence other than a portion that contributed to the evaluating for the extracting of the example sentence;
   reevaluating degrees of matching on a character block basis between the retrieved example sentences and the reevaluation portion of the input sentence;
   re-extracting another retrieved example sentence as a re-extracted example sentence in accordance with the reevaluation; and
   outputting the extracted example sentence and the re-extracted example sentence.

7. An apparatus, comprising:
   one or more computer processors that execute:
      using an input sentence to extract an extracted example sentence from a set of example sentences according to a matching evaluation on a character block basis between the input sentence and the set of example sentences;
      selecting, as a reevaluation portion, a portion of the input sentence other than a portion that contributed to the matching evaluation for the extracting of the extracted example sentence;
      re-extracting another example sentence from the set of example sentences according to a re-evaluation of the matching using the reevaluation portion of the input sentence; and
      identifying example sentence segments for segments of the input sentence based upon candidate sentence segments according to the extracted and re-extracted example sentences.

8. The apparatus according to claim 7, wherein the retrieved example sentences correspond to original sentences written in two or more languages, and
   a computer processor translates the input sentence according to the extracted and re-extracted example sentences.

9. The apparatus according to claim 7, wherein the set of example sentences is obtained by retrieving example sentences using the input sentence as a retrieval condition.

10. The apparatus according to claim 7, wherein the matching evaluation includes evaluating degrees of matching on a character block basis between the input sentence and the set of example sentences.

11. The apparatus according to claim 7, wherein the reevaluating includes reevaluating degrees of matching on a character block basis between the set of example sentences and the reevaluation portion of the input sentence.

* * * * *